(12) United States Patent  (10) Patent No.: US 8,572,347 B2
Kikuchi et al.  (45) Date of Patent: Oct. 29, 2013

(54) STORAGE APPARATUS AND METHOD OF CONTROLLING STORAGE APPARATUS

(75) Inventors: Masayuki Kikuchi, Chigasaki (JP); Satoshi Saito, Odawara (JP); Kana Katayama, Odawara (JP); Yoshihiko Hosobuchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 173 days.

(21) Appl. No.: 13/320,213

(22) PCT Filed: Oct. 26, 2011

(86) PCT No.: PCT/JP2011/005968
§ 371 (c)(1),
(2), (4) Date: Nov. 11, 2011

(87) PCT Pub. No.: WO2013/061368
PCT Pub. Date: May 2, 2013

(65) Prior Publication Data
US 2013/0111170 A1 May 2, 2013

(51) Int. Cl.
*G06F 12/00* (2006.01)
(52) U.S. Cl.
USPC .......................................................... 711/170
(58) Field of Classification Search
None
See application file for complete search history.

(56) References Cited

U.S. PATENT DOCUMENTS

| | | | |
|---|---|---|---|
| 8,468,302 B2 * | 6/2013 | Ishizaki et al. | 711/114 |
| 2011/0060885 A1 * | 3/2011 | Satoyama et al. | 711/170 |
| 2011/0167236 A1 | 7/2011 | Orikasa et al. | |
| 2011/0197044 A1 * | 8/2011 | Sudo et al. | 711/165 |
| 2012/0005435 A1 | 1/2012 | Emaru et al. | |
| 2012/0011315 A1 * | 1/2012 | Ishizaki et al. | 711/114 |

FOREIGN PATENT DOCUMENTS

| | | |
|---|---|---|
| EP | 2 302 501 A1 | 3/2011 |
| WO | WO 2011/077489 A1 | 6/2011 |
| WO | WO-2011/092738 A1 | 8/2011 |

OTHER PUBLICATIONS

PCT International Search Report and Written Opinion on application PCT/JP2011/005968 mailed May 2, 2012; 13 pages.

* cited by examiner

*Primary Examiner* — Brian Peugh
(74) *Attorney, Agent, or Firm* — Foley & Lardner LLP

(57) ABSTRACT

A storage apparatus provides a server apparatus with virtual volumes in thin provisioning; allocates a physical page to each pool page from a storage pool that is able to provide a plurality of types of physical pages classified into tiers, the pool page being an allocation unit of a storage area to the virtual volumes; stores an I/O count of each of the pool pages, stores an I/O count policy set for each of the applications; when receiving an I/O request, counts the I/O count of each of the pool pages in accordance with the I/O count policy set for the application having sent the I/O request; determines the tier of the physical page to be allocated to each pool page according to the I/O count of each pool page; and allocating the physical page in the tier determined for each of the pool pages.

16 Claims, 25 Drawing Sheets

Fig. 6

SERVER I/O COUNT MANAGEMENT PROGRAM ~311

| APPLICATION CODE | PROCESS NAME | I/O COUNT POLICY | TARGET STORAGE | COUNT START TIME | COUNT END TIME |
|---|---|---|---|---|---|
| SV001_DB01 | DB01 | COUNT | 12345678 | 00:00:00 | 24:00:00 |
| SV001_APP01 | APP01-1<br>APP01-2 | COUNT | 12345678 | 09:00:00 | 17:00:00 |
| SV001_APP02 | APP02 | COUNT | 12345678 | 18:00:00 | 22:00:00 |
| SV001_APP03 | APP03 | DON'T COUNT | 12345678 | N/A | N/A |

STORAGE I/O COUNT MANAGEMENT TABLE 121

| APPLICATION CODE 1211 | I/O COUNT POLICY 1212 | COUNT START TIME 1213 | COUNT END TIME 1214 |
|---|---|---|---|
| SV001_DB01 | COUNT | 00:00:00 | 00:00:00 |
| SV001_APP01 | COUNT | 09:00:00 | 17:00:00 |
| SV001_APP02 | COUNT | 18:00:00 | 22:00:00 |
| SV001_APP03 | DON'T COUNT | N/A | N/A |
| SV002_DB01 | COUNT | 00:00:00 | 24:00:00 |
| SV002_APP03 | DON'T COUNT | N/A | N/A |

Fig. 8

VIRTUAL LU PAGE MANAGEMENT TABLE (IN STORAGE APPARATUS 10) 122

| VIRTUAL LUN | VIRTUAL LU PAGE START ADDRESS | POOL ID | POOL PAGE START ADDRESS |
|---|---|---|---|
| 20 | 0x0000 | 1 | 0x00000000 |
| 20 | 0x0100 | 1 | 0x00000100 |
| 20 | 0x0200 | 1 | 0x02000200 |
| 20 | 0x0300 | 1 | 0x01000000 |
| 20 | 0x0400 | N/A | N/A |
| 20 | 0x0500 | N/A | N/A |
| 20 | 0x0600 | N/A | N/A |

POOL/PHYSICAL PAGE MANAGEMENT TABLE
(IN STORAGE APPARATUS 10)

| POOL ID | POOL PAGE START ADDRESS | RAID GROUP ID | PHYSICAL PAGE START ADDRESS | TierID | I/O COUNT | COUNT CLEAR DATE/TIME |
|---|---|---|---|---|---|---|
| 1 | 0x00000000 | 10 | 0x4000 | 1 | 53 | 2011/7/8 00:00:00 |
| 1 | 0x00000100 | 11 | 0x0200 | 1 | 600 | 2011/7/8 00:00:00 |
| 1 | 0x01000000 | 18 | 0x0000 | 2 | 0 | 2011/7/8 00:00:00 |
| 1 | 0x01000100 | 15 | 0x1200 | 2 | 300 | 2011/7/8 00:00:00 |
| 1 | 0x02000000 | 21 | 0x3200 | 3 | 72 | 2011/7/8 00:00:00 |
| 1 | 0x02000100 | 22 | 0x0200 | 3 | 300 | 2011/7/8 00:00:00 |
| 1 | 0x02000200 | 23 | 0x1000 | 3 | 93 | 2011/7/8 00:00:00 |
| 1 | 0x03000100 | 35 | 0x1000 | 2 | N/A | N/A |
| 1 | 0x03000200 | 37 | 0x1000 | 2 | N/A | N/A |
| N/A | N/A | 51 | 0x2000 | 1 | N/A | N/A |
| N/A | N/A | 51 | 0x2100 | 1 | N/A | N/A |
| : | : | : | : | : | : | : |

Fig. 10

MIGRATION MANAGEMENT TABLE
(IN STORAGE APPARATUS 10)

| STORAGE ID | FIRST THRESHOLD | SECOND THRESHOLD |
|---|---|---|
| 12345678 | 10000 | 1000 |
| 22222222 | 200000 | 5000 |

Fig. 19

CACHE AREA MANAGEMENT TABLE 1900

| RAID GROUP ID | PHYSICAL PAGE START ADDRESS | CACHE UNIT AREA START ADDRESS |
|---|---|---|
| 10 | 0x1000 | 0x10000 |
| 10 | 0x1100 | 0x10100 |
| 10 | 0x1200 | 0x10200 |
| 10 | 0x1300 | 0x10300 |
| : | : | : |
| N/A | N/A | 0x20000 |
| N/A | N/A | 0x20100 |
| : | : | : |

SERVER I/O COUNT MANAGEMENT TABLE 311

| APPLICATION CODE | PROCESS NAME | I/O COUNT POLICY | TARGET STORAGE | COUNT START TIME | COUNT END TIME |
|---|---|---|---|---|---|
| SV001_DB01 | DB01 | 3 | 12345678 | 00:00:00 | 24:00:00 |
| SV001_APP01 | APP01-1 APP01-2 | 1 | 12345678 | 09:00:00 | 17:00:00 |
| SV001_APP02 | APP02 | 2 | 12345678 | 18:00:00 | 22:00:00 |
| SV001_APP03 | APP03 | 0 | 12345678 | N/A | N/A |

STORAGE I/O COUNT MANAGEMENT TABLE 121

| APPLICATION CODE 1211 | I/O COUNT POLICY 1212 | COUNT START TIME 1213 | COUNT END TIME 1214 |
|---|---|---|---|
| SV001_DB01 | 3 | 00:00:00 | 00:00:00 |
| SV001_APP01 | 1 | 09:00:00 | 17:00:00 |
| SV001_APP02 | 2 | 18:00:00 | 22:00:00 |
| SV001_APP03 | 0 | N/A | N/A |
| SV002_DB01 | 2 | 00:00:00 | 24:00:00 |
| SV002_APP03 | 0 | N/A | N/A |

Fig. 25
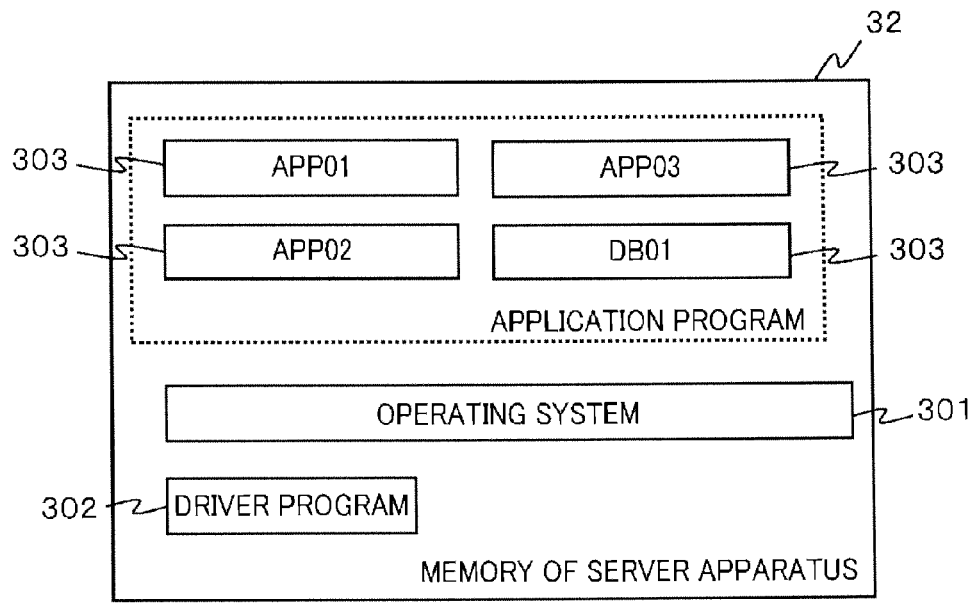
[Fig. 26]
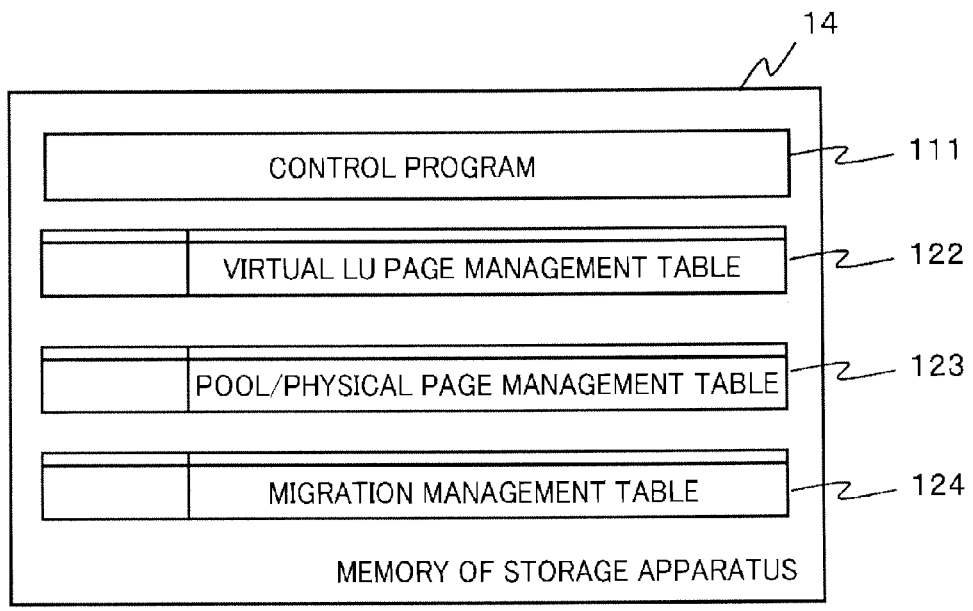

STORAGE APPARATUS AND METHOD OF CONTROLLING STORAGE APPARATUS

TECHNICAL FIELD

The present invention relates to a storage apparatus and a method for controlling a storage apparatus.

BACKGROUND ART

Thin provisioning is a technique to allocate a real page to a virtual page forming a virtual volume when performing a write operation on the virtual page. Patent Literature 1 discloses a storage system configured to perform storage control employing thin provisioning with a storage tiering technique, and to allocate a real page in a different tier to the virtual page, depending on traffic to the virtual page.

CITATION LIST

Patent Literature

[PTL 1] International Patent Application Publication No. WO2011/077489

SUMMARY OF INVENTION

Technical Problem

In the case where a real page in a different tier is allocated to a virtual page depending on the traffic to the virtual page like the foregoing storage system, a real page in an appropriate tier may not be always allocated to the virtual page. For example, even when I/O requests for processing not requiring very high I/O performance, such as data backup and batch processing, are frequently issued, real pages in a tier of high I/O performance may be allocated in some cases.

The present invention has been made in consideration of the aforementioned circumstances, and an objective thereof is to provide a storage apparatus capable of allocating a real page to a virtual page appropriately, and a method for controlling a storage apparatus.

Solution to Problem

In an aspect of the present invention to achieve the foregoing objective, a storage apparatus is communicatively coupled to a server apparatus on which a plurality of applications run; provides the server apparatus with a virtual volume in thin provisioning; performs I/O processing on the virtual volume according to an I/O request sent from the server apparatus; allocates, from a storage pool that is able to provide a plurality of types of physical pages classified into tiers, a physical page to each of pool pages, the pool page being an allocation unit of a storage area to the virtual volume; stores an I/O count of each of the pool pages, the I/O count indicating a number of the I/O requests issued to each of the pool pages; stores an I/O count policy that is a policy specifying a method of counting the I/O count, the I/O policy being set for each of the applications; receives information specifying the application that issued the I/O request, when receiving the I/O request; counts the I/O count of each of the pool pages in accordance with the I/O count policy set for the application specified from the received information; determines the tier of the physical page to be allocated to each of the pool pages, according to the I/O count of each of the pool pages; and allocates the physical page in the tier determined for each of the pool pages, to each of the pool pages.

Other problems and solutions to the problems disclosed by the present application will be clearly illustrated in "Description of Embodiments," the description of the drawings and the like.

Advantageous Effects of Invention

With the present invention, real pages can be allocated to virtual pages appropriately.

BRIEF DESCRIPTION OF DRAWINGS

FIG. 6 shows an example of a server I/O count management table 311.

FIG. 7 shows an example of a storage I/O count management table 121.

FIG. 8 shows an example of a virtual LU page management table 122.

FIG. 10 shows an example of a migration management table 124.

FIG. 19 shows an example of a cache area management table 1900.

FIG. 21 shows an example of a server I/O count management table 311 according to a second embodiment.

FIG. 22 shows an example of a storage I/O count management table 121 according to the second embodiment.

FIG. 25 is a diagram showing main programs and main data stored in a memory 32 of a server apparatus 3 of the information processing system 1 illustrated as the third embodiment.

FIG. 26 is a diagram showing main programs and main data stored in a memory 14 of a storage apparatus 10 of the information processing system 1 illustrated as the third embodiment.

DESCRIPTION OF EMBODIMENTS

Hereinafter, embodiments for implementing the present invention will be described with reference to the drawings.

First Embodiment

Figure 1:
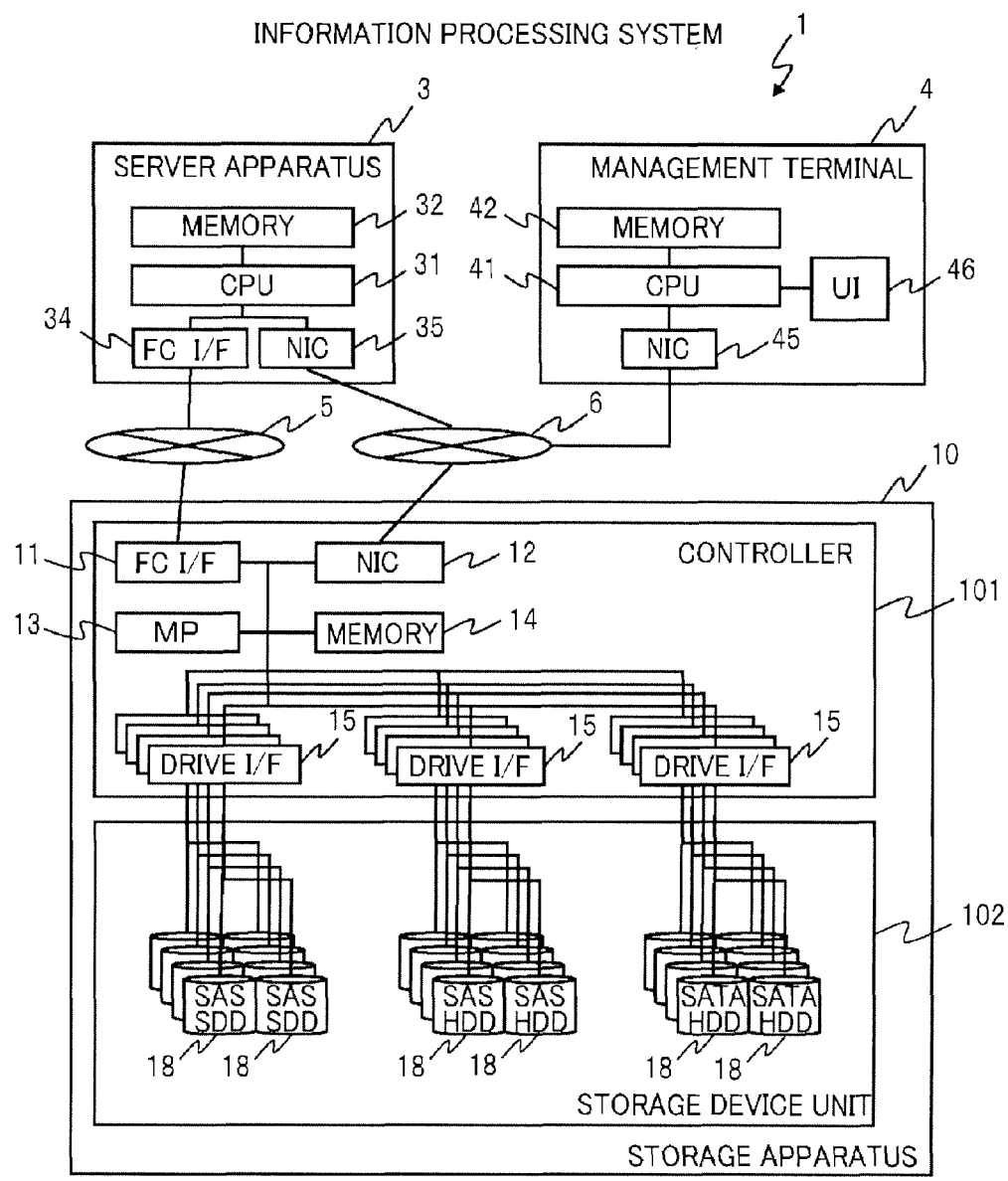
FIG. 1 is a diagram showing a hardware configuration of an information processing system 1.

FIG. 1 shows a hardware configuration of an information processing system 1 described as a first embodiment. As shown in FIG. 1, the information processing system 1 includes one or more server apparatus 3, one or more storage apparatus 10, and a management terminal 4.

The server apparatus 3 is a computer (information apparatus) that provides services such as an automated teller service of a bank or a provision service of web pages for browsing, for example. The storage apparatus 10 is an apparatus that provides a data storage area to application programs and the like running on the server apparatus 3, and, for example, is a disk array device.

The server apparatus 3 and the storage apparatus 10 are communicatively coupled to each other through a first communication network 5. The first communication network 5 is, for example, a network such as an SAN (Storage Area Network), a LAN, a WAN, the Internet, a public telecommunication network, or a dedicated line.

The management terminal 4 is communicatively coupled to the server apparatus 3 and the storage apparatus 10 through a second communication network 6. The second communication network 6 is a network, for example, such as, a LAN, a WAN, the Internet, a public telecommunication network, or a dedicated line.

The server apparatus 3 transmits an I/O request (a data write request, a data read request or the like) to the storage apparatus 10 when accessing a storage area provided by the storage apparatus 10. The I/O request is transmitted, for example, as a data frame (for example, FC (Fibre Channel) frame, hereinafter abbreviated as a frame).

As shown in FIG. 1, the server apparatus 3 includes a CPU 31, and a memory 32 (RAM, ROM, NVRAM (Non Volatile RAID or the like), a first network interface (hereinafter, called a first network I/F 34), and a second network interface (hereinafter, called a second network I/F 35).

The first network I/F 34 is an interface for coupling to the first communication network 5, for example, such as an FC (Fibre Channel) interface, an HBA (Host Bus Adapter), and a NIC (Network Interface Card). The second network I/F 35 is an interface for coupling to the second communication network 6, for example, an NIC.

As shown in FIG. 1, the storage apparatus 10 includes a controller 101 and a storage device unit 102. The controller 101 includes a first network interface (hereinafter, called a first network I/F 11), a second network interface (hereinafter, called a second network I/F 12), a microprocessor (hereinafter, called an MP 13), a memory 14 (including a cache memory and a shared memory), and a drive interface (hereinafter, called a drive I/F 15).

The first network I/F 11 of the controller 101 is an interface for coupling to the first communication network 5. The first network I/F 11 receives a frame sent from the server apparatus 3, and sends to the server apparatus 3 a frame including a response of processing for the I/O request included in the received frame (for example, data read from the storage device unit 102, a read completion report, or a write completion report). The second network I/F 12 of the controller 101 is an interface for coupling to the second communication network 6.

The MP 13 is formed of a CPU, an MPU (Micro Processing Unit), a DMA (Direct Memory Access) and the like. The MP 13 performs certain types of processing responding to I/O requests that the first network I/F 11 receives from the server apparatus 3. The types of processing herein are, for example, to receive and send data read from the storage device unit 102 (hereinafter, such data is called read data), to receive and send data to be written to the storage device unit 102 (hereinafter, such data is called write data), to perform staging of data to the memory 14 (read data from the storage device unit 102 to the memory 14), and to perform destaging of data (write back data from the memory 14 to the storage device unit 102).

The memory 14 is formed of a RAM, a ROM, an NVRAM, or the like. The memory 14 stores therein data targeted by I/O requests, data used to control processing for I/O requests and other data.

The drive I/F 15 communicates with the storage device unit 102 for reading data from the storage device unit 102 and for writing data to the storage device unit 102. The drive I/F 15 is formed of, for example, a SATA (Serial ATA) interface.

The storage device unit 102 includes multiple storage drives 18 which are physical recording media. The storage drives 18 are, for example, semiconductor storage devices (SSD), and hard disk drives (for example, an SAS (Serial Attached SCSI) hard disk drive, a SATA hard disk drive, an FC (Fibre Channel) hard disk drive, a PATA (Parallel ATA) hard disk drive, a SCSI hard disk drive and the like). The storage device unit 102 may be housed either in the same chassis as or a chassis different from a chassis where the storage apparatus 10 is housed.

The storage apparatus 10 includes a RAID (Redundant Arrays of Inexpensive (or Independent) Disks) group (Parity Group) formed of one or more storage drives 18. The storage apparatus 10 partitions a storage area of the RAID group into predetermined unit areas (hereinafter, called physical devices), and provides the physical devices to the server apparatuses 3. In addition, the storage apparatus 10 provides the server apparatuses 3 with a LU (Logical Unit or Logical Volume) that is a logical volume formed by using the physical device. The storage apparatus 10 manages mapping between LUs and physical devices. The mapping between LUs and physical devices is in a one-to-one relationship in some cases, or is in a one-to-many relationship in other cases.

Each LU is assigned a unique identifier (hereinafter, called a LUN (Logical Unit Number)). The server apparatus 3 specifies an access target storage area by setting the LUN and a block address in a frame to be sent to the storage apparatus 10. Upon receipt of a frame having an I/O request from the server apparatus 3, the storage apparatus 10 identifies the physical device forming the specified LU and performs processing designated in the I/O request.

The management terminal 4 includes a CPU 41, a memory 42 (a RAM, a ROM, a NVRAM or the like), a network interface (hereinafter, called a network I/F 45)(an NIC or the like), and a user interface (hereinafter, called a UI 46)(a keyboard, a mouse, a touch panel, a liquid crystal monitor and the like).

Hereinafter, description will be provided for basic processing that the storage apparatus 10 performs upon receipt of an I/O request from the server apparatus 3.

<In the Case of Receiving Data Write Request>

When a data write request sent from the server apparatus 3 arrives at the first network I/F 11, the first network I/F 11 sends a notification of the arrival to the MP 13. The MP 13 that receives the notification generates a drive write request, sends the drive write request to the drive I/F 15, and stores write data attached to the data write request into the memory 14. Upon receipt of the drive write request from the MP 13, the drive I/F 15 registers the received drive write request in a write process wait queue.

The drive I/F 15 reads each of the drive write requests from the write process wait queue as needed. The drive I/F 15 reads write data specified in the read drive write request from the memory 14, and writes the read write data to the storage drive 18. Then, the drive I/F 15 sends to the MP 13 a report that the writing of the write data for the drive write request is completed (completion report). Upon receipt of the completion report sent from the drive I/F 15, the MP 13 sends a notification of the completion report to the first network I/F 11. Upon receipt of the notification, the first network I/F 11 sends a completion notification to the server apparatus 3.

<In the Case of Receiving Data Read Request>

When a data read request sent from the server apparatus 3 arrives at the first network I/F 11, the first network I/F 11 sends a notification of the arrival to the drive I/F 15. Upon receipt of the notification, the drive I/F 15 reads data specified in the data read request (data specified by, for example, an LBA (Logical Block Address) and a data length) from the storage drive 18. Here, when the read data already exists in the memory 14 (when it is already staged), the read operation from the storage drive 18 is omitted.

The MP 13 writes the data read by the drive I/F 15 to the memory 14 (staging), and transfers the data written in the memory 14 to the first network I/F 11 when necessary. The first network I/F 11 receives the read data sent from the MP 13, and sends the received read data to the server apparatus 3.

<Schematic Configuration of Information Processing System 1>

Figure 2:
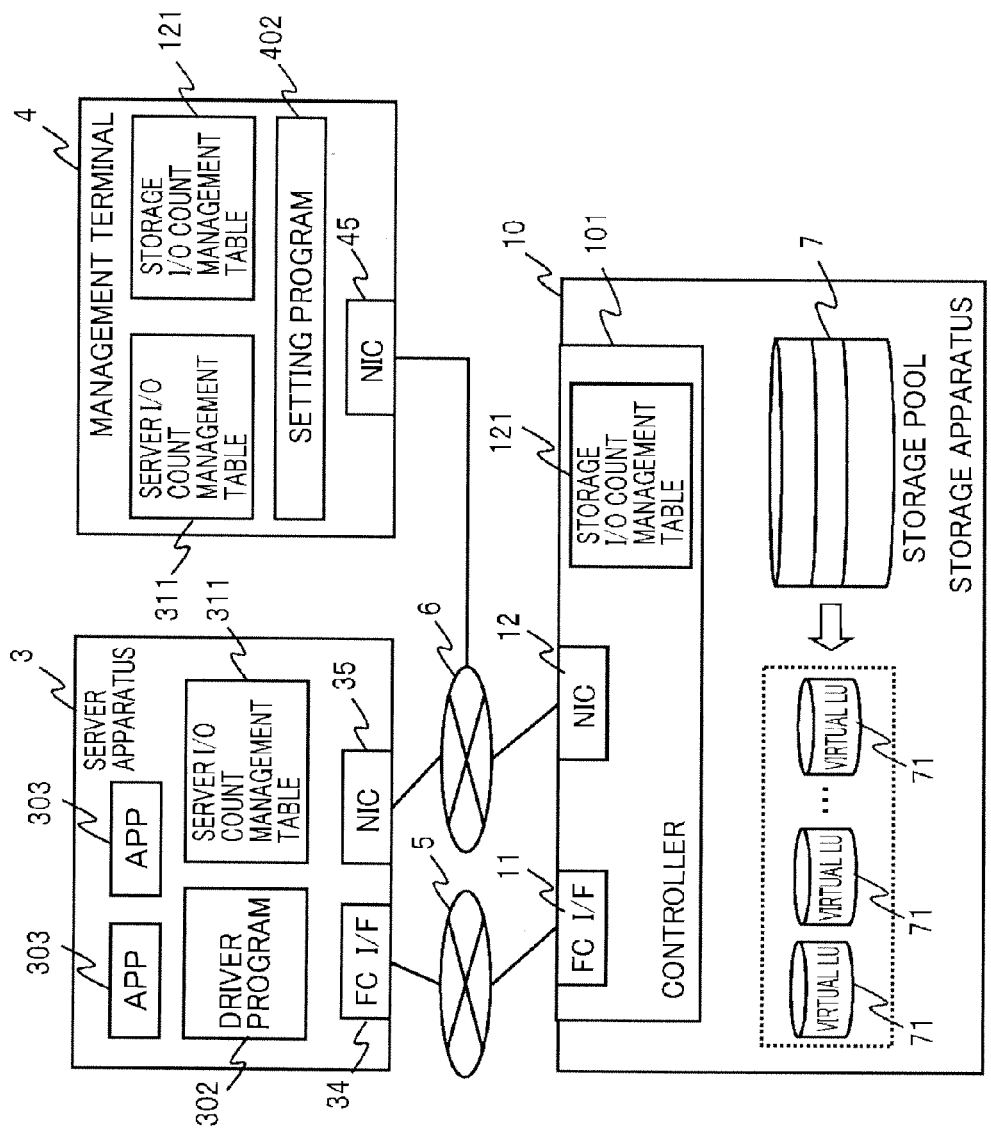
FIG. 2 is a diagram showing a schematic configuration of the information processing system 1.

FIG. 2 shows an outline of the information processing system 1. As shown in FIG. 2, the server apparatus 3 executes application programs 303 and a driver program 302. In addition, the server apparatus 3 manages a server I/O count management table 311.

On the other hand, the controller 101 of the storage apparatus 10 manages a storage I/O count management table 121. The storage apparatus 10 has a function to manage the storage areas provided by the storage drives 18, as a storage pool 7 in thin provisioning (also called dynamic provisioning). The storage apparatus 10 provides the server apparatus 3 with LUs (hereinafter, called virtual LUs 71) virtually formed by thin provisioning using the storage areas provided from the storage pool 7.

The management terminal 4 executes a setting program 402. The management terminal 4 makes settings and management of both the server I/O count management table 311 managed by the server apparatus 3 and the storage I/O count management table 121 managed by the storage apparatus 10.

<Thin Provisioning>

In the thin provisioning, a group of storage areas provided by the physical devices are managed as one or more storage pools 7. The storage areas of each of the storage pools 7 are usually managed in units of storage areas with a fixed length (hereinafter, the storage area with the fixed length is called a pool page). The allocation of the storage areas to the virtual LUs 71 is performed in units of pool pages.

Irrespective of the physical storage resources (storage devices 18) included in the storage apparatus 10, the thin provisioning enables allocation of the storage areas with a larger capacity to an external apparatus (server apparatus 3) than the capacity that can be provided by the physical storage resources included in the storage apparatus 10. The storage apparatus 10 provides a virtual LU 71 with pool pages, for example, according to an amount of data to be actually written to the virtual LU 71 (according to the use state of the virtual LU 71). With the thin provisioning, the physical storage resources are provided to the server apparatus 3 according to the amount of data to be actually written to the virtual LU 71 as described above, and therefore a storage area larger in size than that available from the physical storage resources currently provisioned in the storage apparatus 10 can be allocated to an external apparatus, independently of the physical storage resources currently provisioned in the storage apparatus 10. Use of thin provisioning leads to, for example, simplification of capacity planning and management work of a storage system.

<Software Configuration>

Figure 3:
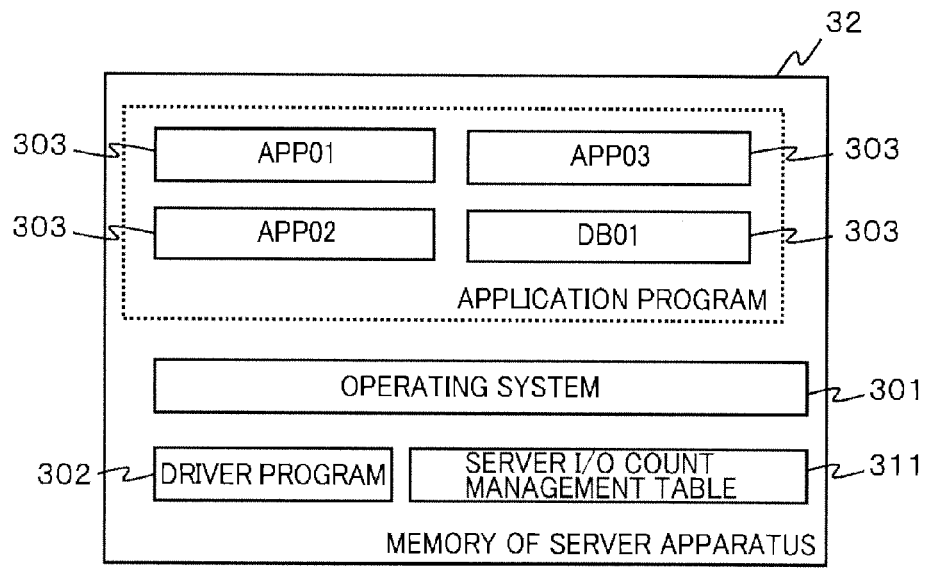
FIG. 3 is a diagram showing main programs and main data stored in a memory 32 in a server apparatus 3.

FIG. 3 shows main programs and main data stored in the memory 32 of the server apparatus 3. The CPU 31 of the server apparatus 3 executes the programs shown in FIG. 3 to implement main functions of the server apparatus 3.

As shown in FIG. 3, the memory 32 of the server apparatus 3 stores therein an operating system 301, a driver program 302, application programs 303, and the server I/O count management table 311.

The operating system 301 performs basic control of the hardware included in the server apparatus 3. The driver program 302 implements a driver to provide functions of generating and sending an I/O request to the storage apparatus 10 and receiving a response from the storage apparatus 10 in response to the sent I/O request.

The application programs 303 (APP01 to APP03, DB01 in FIG. 3) implement applications to provide information processing services to users and the like by accessing the storage apparatus 10 in response to input operations by the users or the like.

Figure 4:
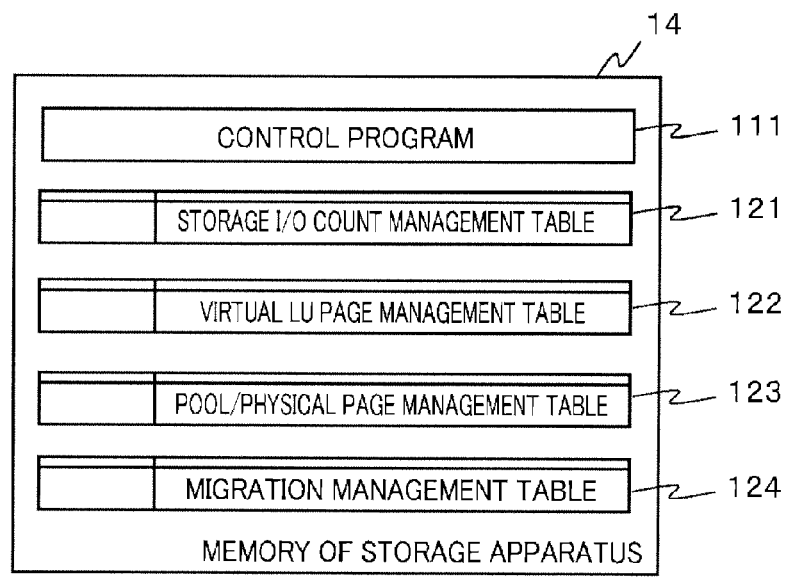
FIG. 4 is a diagram showing main programs and main data stored in a memory 14 in a storage apparatus 10.

FIG. 4 shows a main program and main data stored in the memory 14 of the storage apparatus 10. The MP 13 and others of the storage apparatus 10 execute the programs shown in FIG. 4 to implement main functions of the storage apparatus 10.

As shown in FIG. 4, the memory 14 of the storage apparatus 10 stores therein a control program 111, the storage I/O count management table 121, a virtual LU page management table 122, a pool/physical page management table 123, and a migration management table 124.

The control program 111 implements various aforementioned functions provided by the storage apparatus 10. The control program 111 implements various functions of the storage apparatus 10, for example, such as the foregoing functions of receiving an I/O request, performing processing responding to the I/O request, and sending the response to the I/O program, a function of managing tables, and functions of controlling I/O counts and executing migration, which will be described later.

Figure 5:
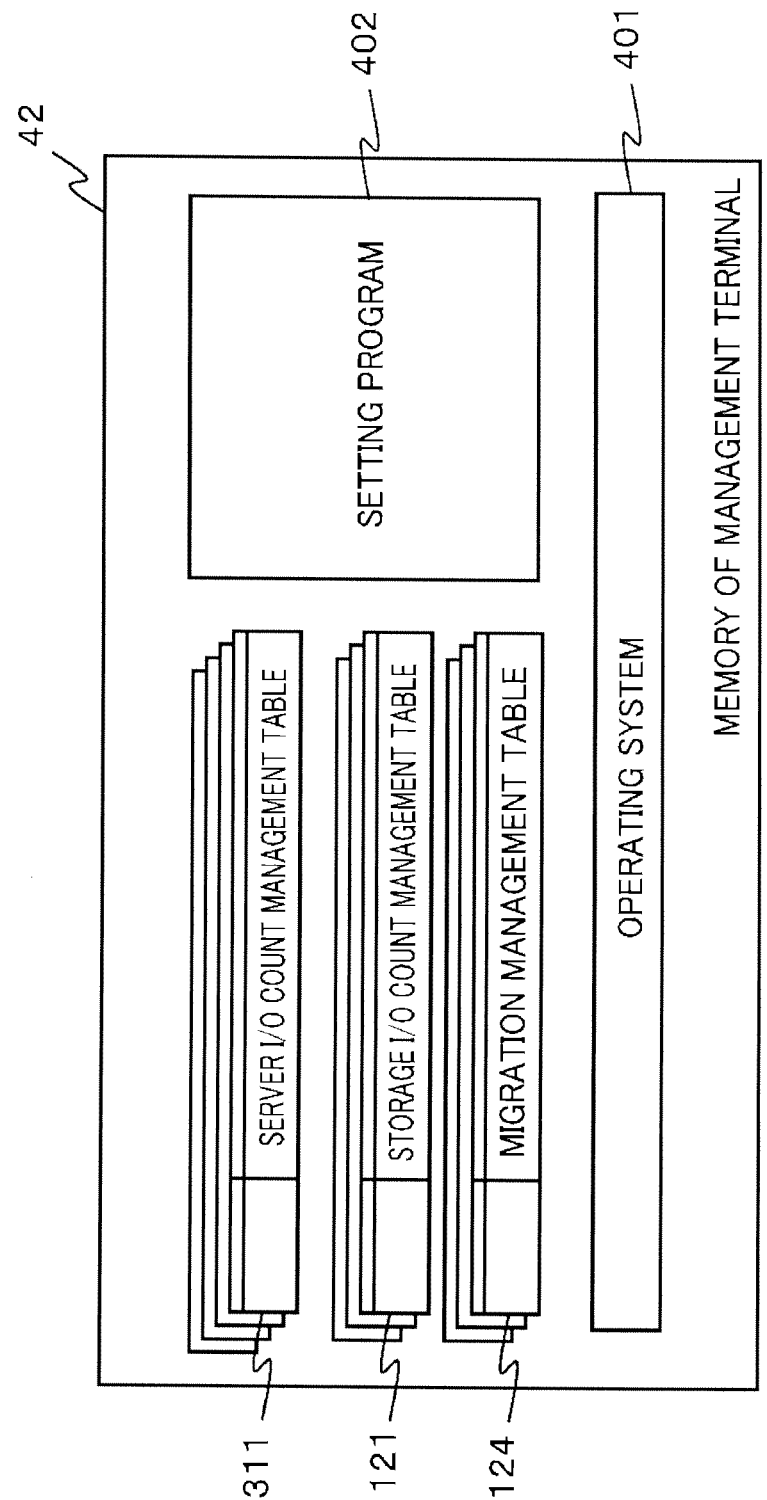
FIG. 5 is a diagram showing a main program and main data stored in a memory 42 of a management terminal 4.

FIG. 5 shows main programs and main data stored in the memory 42 of the management terminal 4. The CPU 41 of the management terminal 4 executes the programs shown in FIG. 5 to implement main functions of the management terminal 4.

As shown in FIG. 5, the memory 42 of the management terminal 4 stores therein an operating system 401, the setting program 402, the server I/O count management table 311, the storage I/O count management table 121, and the migration management table 124.

The operating system 401 performs basic control of the hardware included in the management terminal 4. The setting program 402 provides the users with an environment for setting of the tables and data stored in each of the management terminal 4, the server apparatus 3, and the storage apparatus 10.

FIG. 6 shows an example of the server I/O count management table 311. As shown in FIG. 6, the server I/O count management table 311 includes one or more record having items of an application code 3111, a process name 3112, an I/O count policy 3113, a target storage 3114, a count start time 3115, and a count end time 3116. In FIG. 6, "N/A" indicates that no significant value is set in the table cell.

The application code 3111 is set with an identifier assigned to each application program (hereinafter, called an AP code). The AP code is set, for example, by a user operating the management terminal 4. The process name 3112 is set with the name of a process (hereinafter, called a process name) assigned to the application program executed by the server apparatus 3. In some cases, a plurality of process names are set for one application code 3111.

The I/O count policy 3113 is set with a policy for counting of an I/O count (hereinafter, called an I/O count policy), which will be described later. For example, the I/O count policy 3113 is set with "COUNT" that shows a policy to count the I/O count, or "DON'T COUNT" that shows a policy of not counting the I/O count.

The target storage 3114 is set with an identifier of the storage apparatus 10 (hereinafter, called a storage ID). The target storage 3114 is set with the storage ID of the storage apparatus 10 to which the record is applied.

Values are set in the count start time 3115 and the count end time 3116, in the case that "COUNT" is set in the I/O count policy 3113. The count start time 3115 is set with a time at the start of counting the I/O count (hereinafter, called a count start time). The count end time 3116 is set with a time at the end of counting the I/O count (hereinafter, called a count end time).

FIG. 7 shows an example of the storage I/O count management table 121. As shown in FIG. 7, the storage I/O count management table 121 includes one or more records having each of the items of an application code 1211, an I/O count policy 1212, a count start time 1213, and a count end time 1214. In FIG. 7, "N/A" indicates that no significant value is set in the table cell.

The application code 1211 is set with the AP code described above. The I/O count policy 1212 is set with the I/O count policy described above. The count start time 1213 is set with the count start time described above. The count end time 1214 is set with the count end time described above.

FIG. 8 shows an example of the virtual LU page management table 122 stored in the storage apparatus 10. As shown in FIG. 8, the virtual LU page management table 122 includes one or more records having each of the items of a virtual LUN 1221, a virtual LU page start address 1222, a pool ID 1223, and a pool page start address 1224. In FIG. 8, "N/A" indicates that no significant value is set in the table cell.

The virtual LUN 1221 is set with a LUN of the virtual LU 71 (hereinafter, called a virtual LUN). The virtual LU page start address 1222 is set with the starting address (hereinafter, called a virtual LU page start address) of a unit storage area (hereinafter, called a virtual LU page) with a fixed length partitioned in the storage area in the virtual LU 71.

The pool ID 1223 is set with an identifier of the storage pool 7 (hereinafter, called a pool ID). The pool page start address 1224 is set with the start address of the pool page (hereinafter, called a pool page start address).

Figure 9:
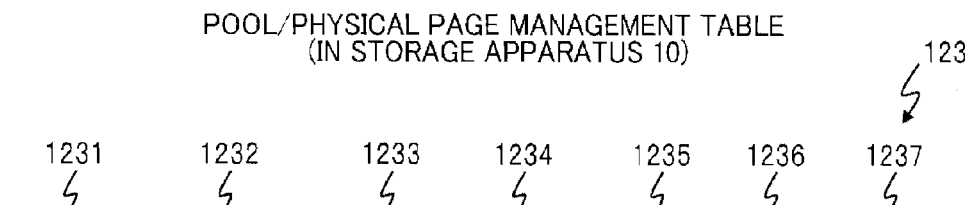
FIG. 9 shows an example of a pool/physical page management table 123.

FIG. 9 shows an example of the pool/physical page management table 123 stored in the storage apparatus 10. As shown in FIG. 9, the pool/physical page management table 123 includes one or more records having each of the items of a pool ID 1231, a pool page start address 1232, a RAID group ID 1233, a physical page start address 1234, a TierID 1235, an I/O count 1236, and a count clear date/time 1237. In FIG. 9, "N/A" indicates that no significant value is set in the table cell.

The pool ID 1231 is set with the pool ID described above. The pool page start address 1232 is set with the pool page start address described above.

The RAID group ID 1233 is set with an identifier of the physical device (hereinafter, called a RAID group ID). The physical page start address 1234 is set with the start address (hereinafter, called a physical page start address) of a unit storage area (hereinafter, called a physical page) with a fixed length partitioned in the storage area in the physical device.

The TierID 1235 is set with a value (hereinafter, called a TierID) indicating a tier of a physical page forming the pool page. Here, the tier is information (attribute) set according to characteristics of the physical page forming the pool page (a type, performance, reliability, cost and the like of a storage drive 18 implementing the physical page). The information processing system 1 in this embodiment is provided with three tiers (Tier1, Tier2, and Tier3). A physical page in the tier "Tier1" is formed by using a storage area of an SSD; a physical page in the tier "Tier2" is formed by using a storage area of a storage drive 18 with SAS technology; and a physical page in the tier "Tier3" is formed by using a storage area of a storage drive 18 with SATA technology.

The I/O count 1236 is set with the number of the I/O requests issued to the physical page (hereinafter, called an I/O count). The count clear date/time 1237 is set with a date/time (tier determination date/time) of initializing the contents (setting "0") in the I/O count 1236. An event in which the current date/time passes the count clear date/time 1237 is used as a trigger to execute migration processing S2000 which will be described later.

FIG. 10 shows an example of the migration management table 124 stored in the storage apparatus 10. In the migration management table 124, information for determining the tier of the pool page is managed.

As shown in FIG. 10, the migration management table 124 includes one or more records having each of the items of a storage ID 1241, a first threshold 1242, and a second threshold 1243.

The storage ID 1241 is set with the storage ID of the storage apparatus 10 to which the record is applied. The first threshold 1242 is set with a threshold set for the storage apparatus 10 (hereinafter, called a first threshold). The second threshold 1243 is set with another threshold set for the storage apparatus 10 (hereinafter, called a second threshold (<the first threshold)). The user can make setting of the migration management table 124 by operating the management terminal 4.

Figure 11:
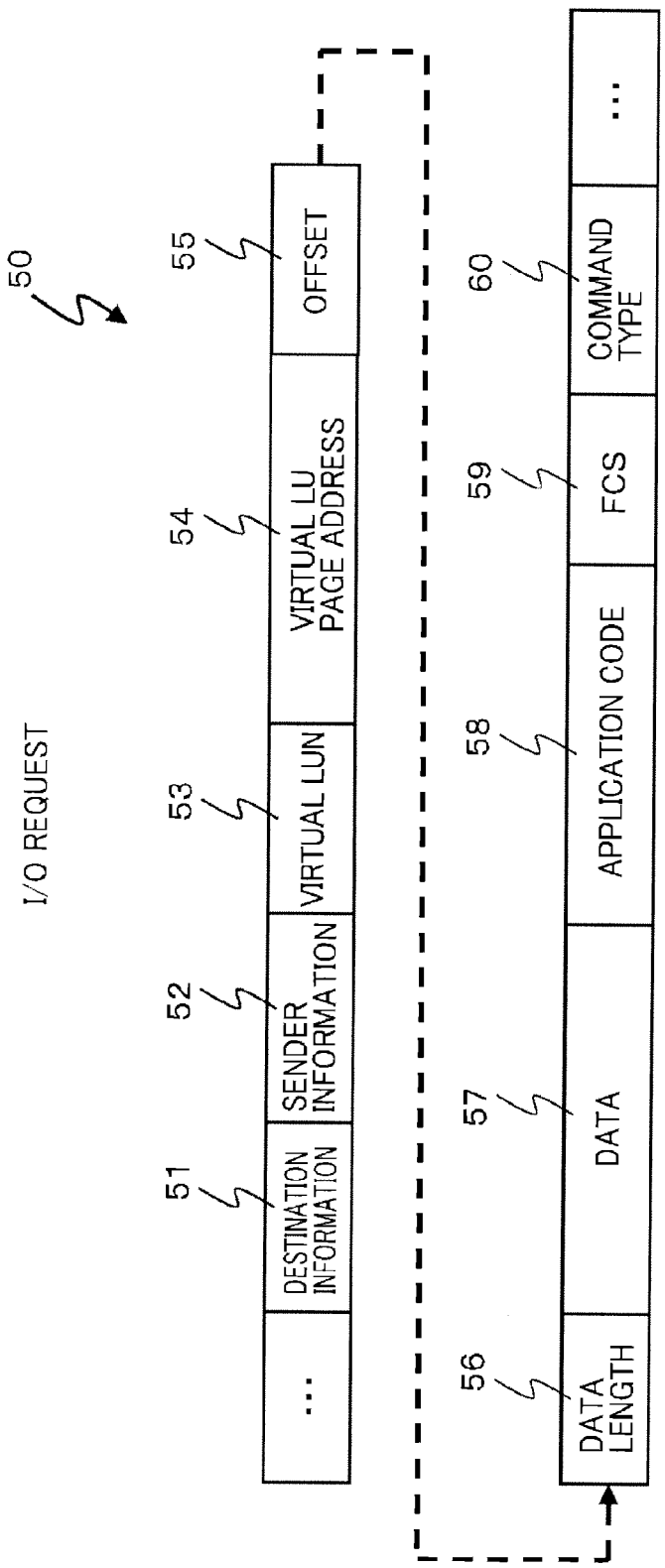
FIG. 11 shows an example of an I/O request 50.

FIG. 11 shows an example of an I/O request 50 sent from the server apparatus 3 to the storage apparatus 10. As shown in FIG. 11, the I/O request 50 includes information such as destination information 51, sender information 52, virtual LUN 53, virtual LU page address 54, offset 55, data length 56, data 57, application code 58, FCS 59 (Frame Check Sequence), and command type 60.

The destination information 51 is set with the storage ID of the storage apparatus 10 to which the I/O request 50 is to be sent. The sender information 52 is set with an identifier of the server apparatus 3 that is a sender of the I/O request 50.

The virtual LUN 53 is set with the virtual LUN of the virtual LU 71 targeted by the I/O request 50.

The virtual LU page address 54 is set with the address (hereinafter, called a virtual LU page address) of the virtual LU page targeted by the I/O request 50. The offset 55 is set with an offset value of the virtual LU page address 54.

The data length 56 is set with a data length of data stored in the data 57. The data 57 is set with data (write data or the like) for the I/O request 50.

The application code 58 is set with the application code described above. The FCS 59 (Frame Check Sequence) is set with an error detection code such as checksum.

The command type 60 is set with information indicating a type of the I/O request 50 (a data write request, a data read request, or the like).

<Table Setting>

Figure 12:
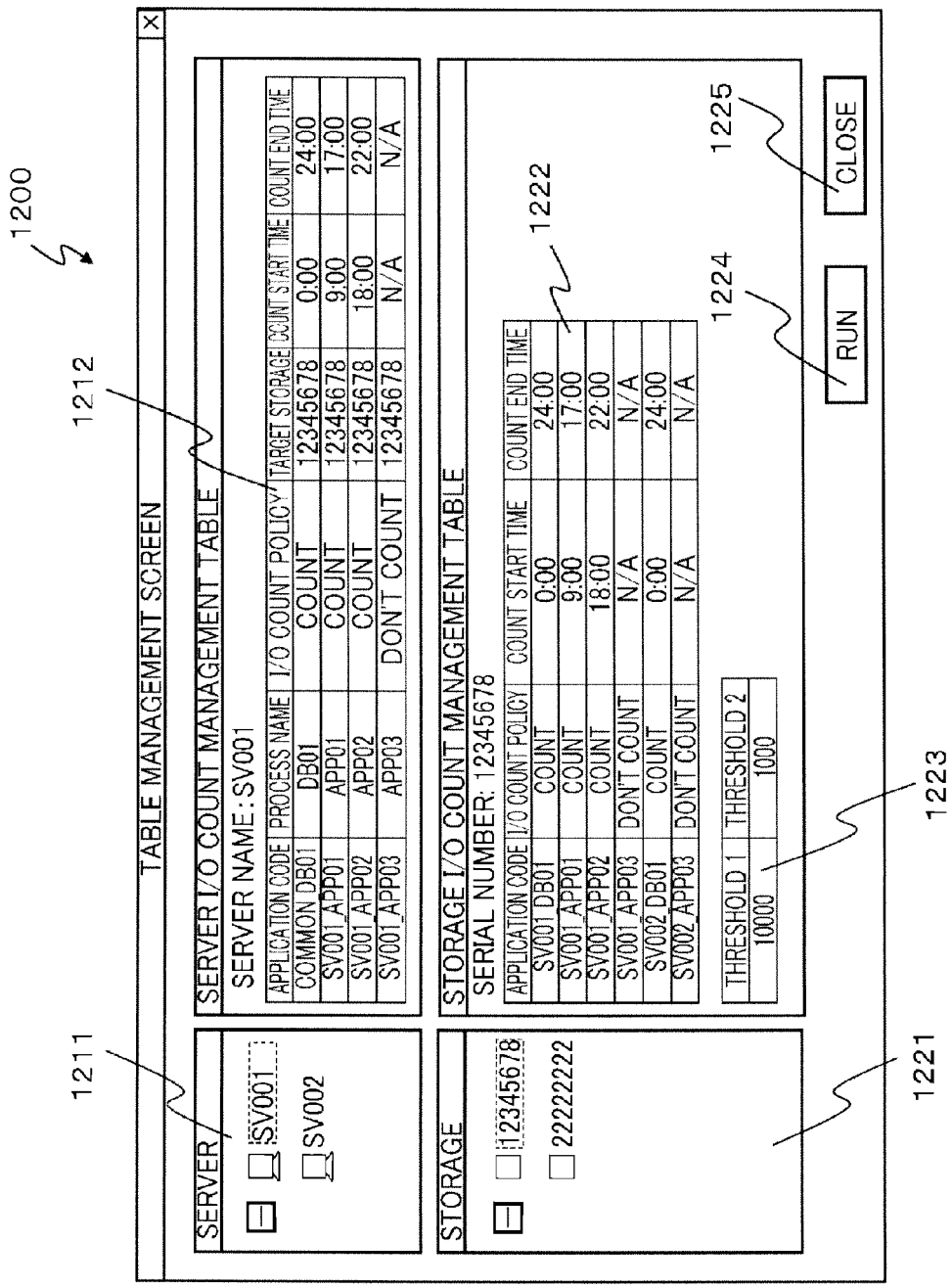
FIG. 12 shows an example of a table management screen 1200.

FIG. 12 shows an example of a screen (hereinafter, called a table management screen 1200) that the UI 46 of the management terminal 4 displays when a user makes settings of the server I/O count management table 311 or the storage I/O count management table 121 by operating the management terminal 4. As shown in FIG. 12, the table management screen 1200 is provided with a server apparatus selection field 1211, a server I/O count management table setting field 1212, a storage apparatus selection field 1221, a storage I/O count management table setting field 1222, a migration management table setting field 1223, a run button 1224, and a close button 1225.

In order to make settings of the server I/O count management table 311, the user selects the server apparatus 3 targeted for the settings in the server apparatus selection field 1211, and edits the server I/O count management table setting field 1212.

In order to make settings of the storage I/O count management table 121, the user selects the storage apparatus 10 targeted for the settings in the storage apparatus selection field 1221, and edits the storage I/O count management table setting field 1222.

In the case of making settings of the migration management table 124, the user selects the storage apparatus 10 targeted for the setting in the storage apparatus selection field 1221, and edits the migration management table setting field 1223.

When the user operates the run button 1224 after completing the input for the settings, the contents edited on the table management screen 1200 are transmitted from the management terminal 4 to the target server apparatus 3 or the target storage apparatus 10, and are reflected in the server I/O count management table 311 of the target server apparatus 3, or the storage I/O count management table 121 or the migration management table 124 of the target storage apparatus 10.

Figure 13:
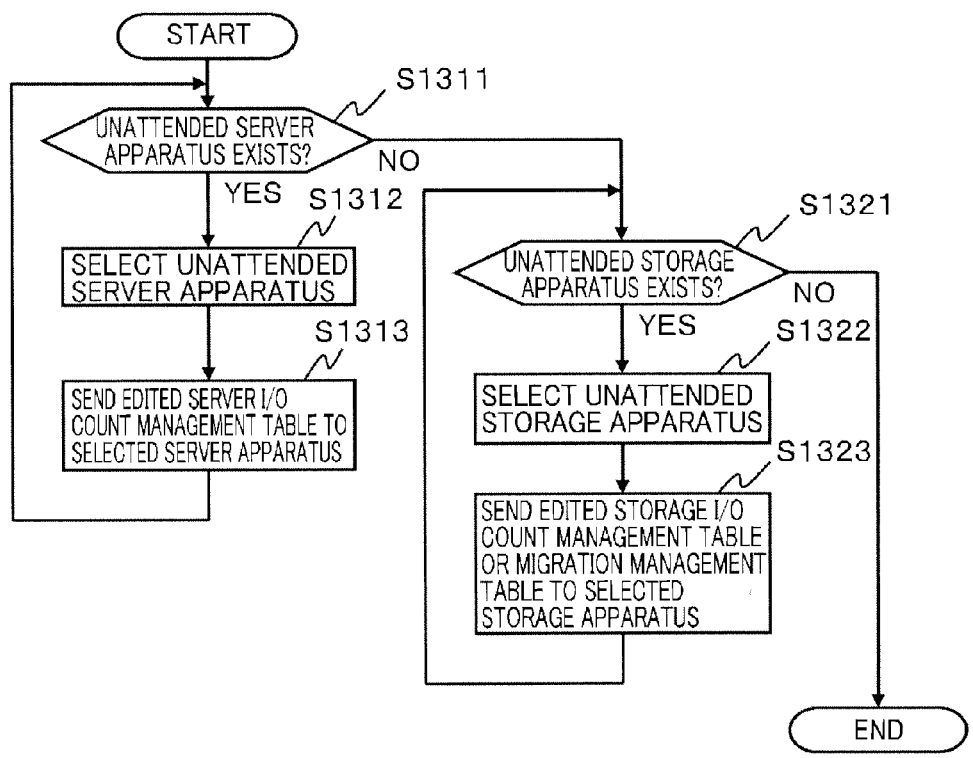
FIG. 13 is a flowchart explaining table synchronization processing S1300.

FIG. 13 is a flowchart explaining processing (hereinafter, called table synchronization processing S1300) performed between the management terminal 4 and the server apparatus 3 or between the management terminal 4 and the storage apparatus 10 when the user operates the run button 1224.

In S1311, the management terminal 4 determines whether or not there is an unattended server apparatus 3 (a server apparatus 3 in which the contents of the server I/O count management table 311 have already been edited on the table management screen 1200, but the edited contents are not yet reflected). In the case that there is no unattended server apparatus 3 (S1311: NO), the processing advances to S1321. In the case that the unattended server apparatus 3 exists (S1311: YES), the management terminal 4 selects the unattended server apparatus 3 (S1312), and transmits the edited server I/O count management table 311 to the selected server apparatus 3 (S1313). In response to this, the destination server apparatus 3 updates the contents of the server I/O count management table 311 to the edited contents. Then, the processing returns to S1311.

In S1321, the management terminal 4 determines whether or not there is an unattended storage apparatus 10 (a storage apparatus 10 in which the contents of the storage I/O count management table 121 or the migration management table 124 are already edited on the table management screen 1200, but the edited contents are not yet reflected). In the case that there is no unattended storage apparatus 10 (S1321: NO), the processing is terminated. In the case that the unattended storage apparatus 10 is present (S1321: YES), the management terminal 4 selects the unattended storage apparatus 10 (S1322), and transmits the edited contents of the storage I/O count management table 121 or the edited migration management table 124 to the selected storage apparatus 10 (S1323). In response to this, the destination storage apparatus 10 updates the contents of the storage I/O count management table 121 or the migration management table 124 to the edited contents. Then, the processing returns to S1321.

=I/O Count Control and Migration=

The storage apparatus 10 controls counting of the I/O count of each pool page in accordance with the I/O count policy, the count start time, and the count end time set for each application of the server apparatus 3. Then, the storage apparatus 10 determines a tier of each pool page by checking the I/O count of the pool page against the migration management table 124. In the case that the determined tier of the pool page is different from the current tier of the pool page, the storage apparatus 10 migrates data stored in the physical page, and thereby makes the tier of the pool page coincide with the determined tier. Hereinafter, these processing operations are described one by one.

Figure 14:
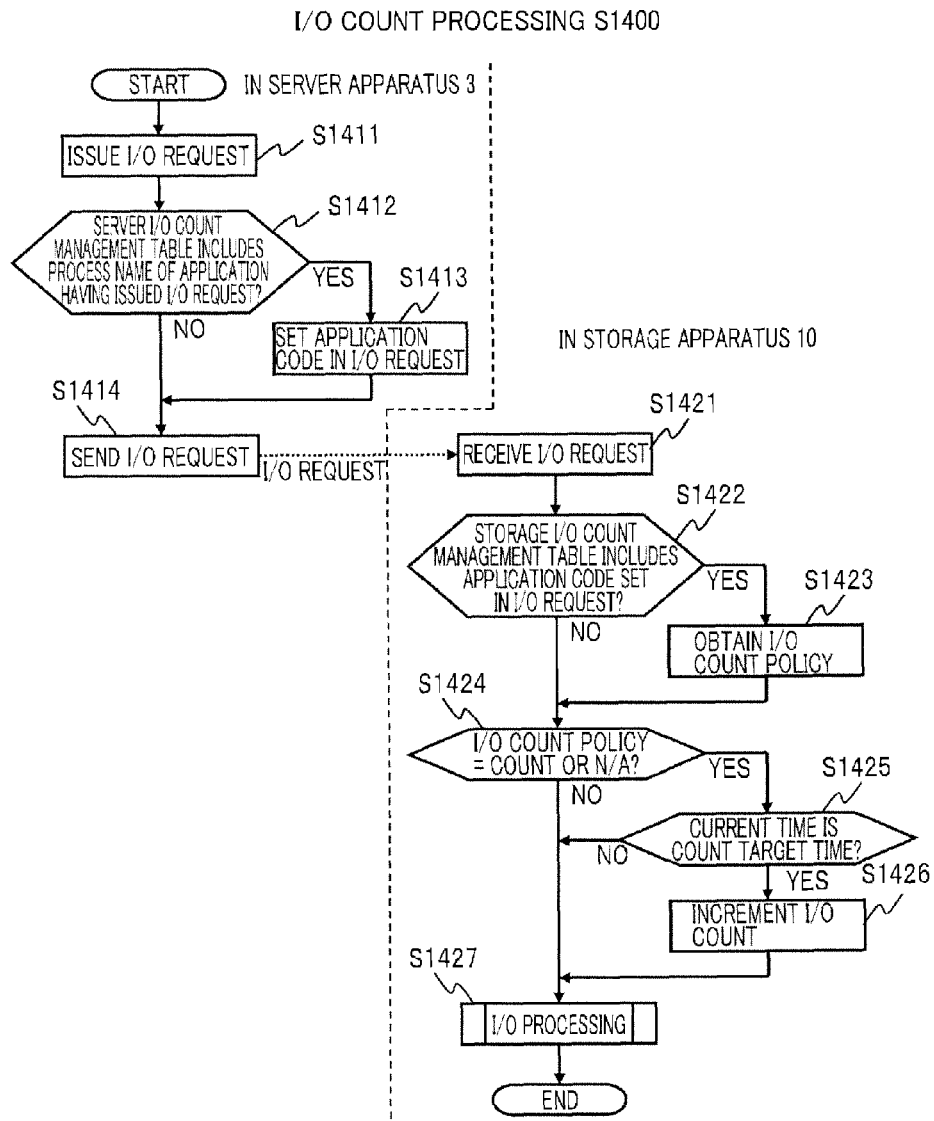
FIG. 14 is a flowchart explaining I/O count processing S1400.

FIG. 14 is a flowchart explaining processing (hereinafter, called I/O count processing S1400) that the server apparatus 3 and the storage apparatus 10 perform when the server apparatus 3 sends an I/O request 50 to the storage apparatus 10 in accordance with an instruction from an application. The I/O count processing S1400 is described below in reference to FIG. 14.

When the server apparatus 3 generates an I/O request 50 in response to an instruction from an application (S1411), the server apparatus 3 judges whether or not the application having issued the instruction is registered in the server I/O count management table 311 (S1412). This judgment is made by checking whether or not the server I/O count management table 311 includes a record having the process name of the application having issued the command. In the case that the application is not registered (S1412: NO), the server apparatus 3 transmits the I/O request 50 to the storage apparatus 10 (S1414). In the case that the application is registered (S1412: YES), the server apparatus 3 generates an I/O request 50 in which the application code of the application is set (S1413), and transmits the generated I/O request 50 to the storage apparatus 10 (S1414).

When the storage apparatus 10 receives the I/O request 50 from the server apparatus 3 (S1421), the storage apparatus 10 judges whether or not the storage I/O count management table 121 includes a record having the application code set in the I/O request 50 (S1422). In the case that the record is not present (S1422: NO), the processing advances to S1424. In the case that the record is present (S1422: YES), the storage apparatus 10 acquires the I/O count policy from the record (S1423).

In S1424, the storage apparatus 10 determines the content of the I/O count policy acquired in S1423. In the case that "COUNT" is set in the I/O count policy or in the case that nothing is set in the I/O count policy (S1424: YES), the processing advances to S1425. In the case that "DON'T COUNT" is set in the I/O count policy, the processing advances to S1427.

In S1425, the storage apparatus 10 judges whether or not the current time is a count target time of I/O count, i.e., whether or not the current time falls within a period defined by the count start time and the count end time. In the case that the current time is the count target time (S1425: YES), the storage apparatus 10 adds a predetermined value (e.g., "1") to the I/O count (the content in the I/O count 1236) of the pool gape of the record (S1426). Then, the processing advances to S1427.

In S1427, the storage apparatus 10 performs I/O processing according to the I/O request 50.

FIGS. 15 to 18 are flowcharts explaining the details of the processing S1427. The processing S1427 is described below in reference to FIGS. 15 to 18.

Figure 15:
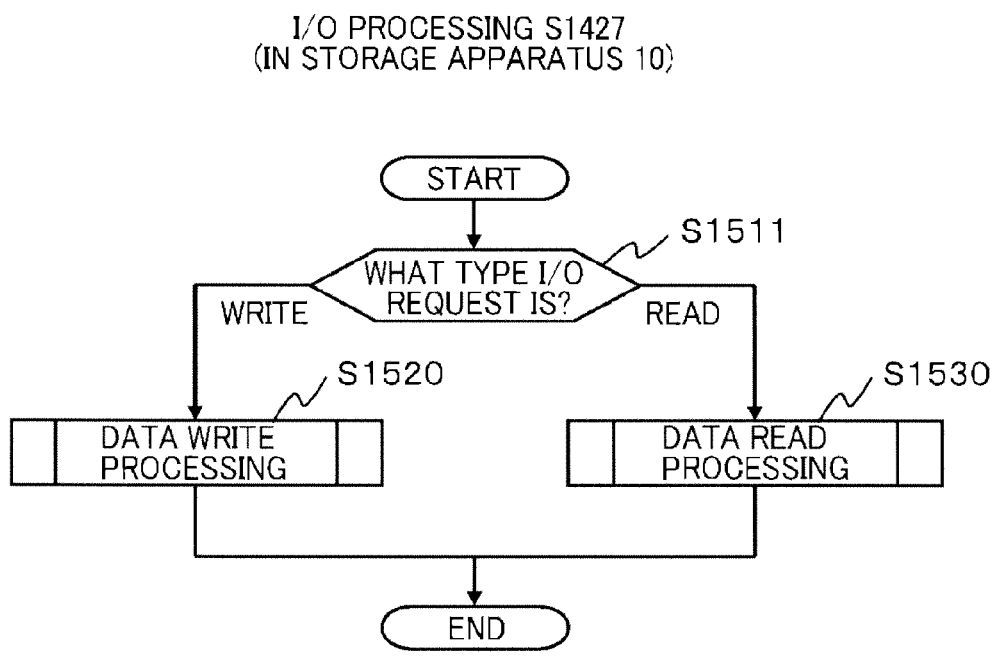
FIG. 15 is a flowchart explaining I/O processing 1500.

As shown in FIG. 15, in the I/O processing S1427, the storage apparatus 10 firstly refers to the command type 60 in the I/O request 50, and thereby judges which one of a data write request and a data read request the I/O request 50 received in S1421 is (S1511). In the case that the I/O request 50 is the data write request (S1511: Write), the storage apparatus 10 performs processing for writing data (hereinafter, called data write processing S1520). In the case that the I/O request 50 is the data read request (S1511: Read), the storage apparatus 10 performs processing for reading data (hereinafter, called data read processing S1530).

Figure 16:
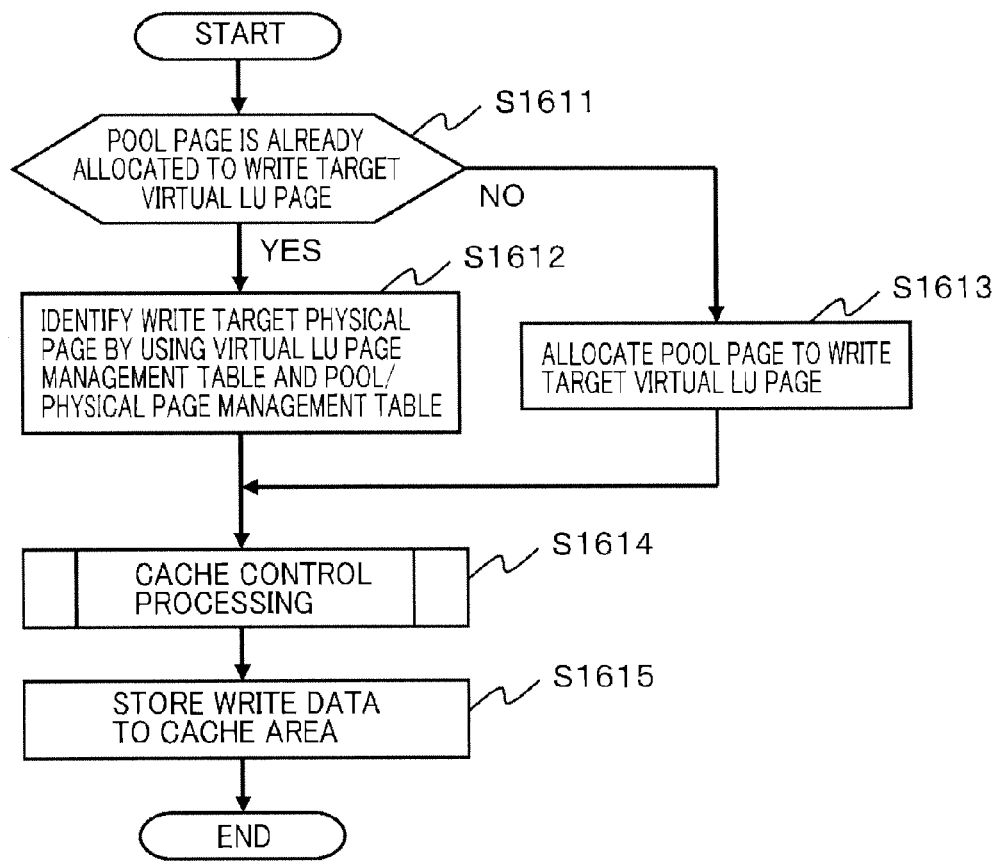
FIG. 16 is a flowchart explaining data write processing S1520.

FIG. 16 is a flowchart explaining the details of the data write processing S1520 shown in FIG. 15. First, the storage apparatus 10 checks the contents in the virtual LUN 53 and the page address 54 in the I/O request 50 against the virtual LU page management table 122, and thereby judges whether or not the pool page (pool page start address) is already allocated to the virtual LU page specified by the virtual LUN 53 and the page address 54 in the I/O request 50 (whether or not values other than "N/A" are set in the pool ID 1223 and the pool page start address 1224)(S1611). In the case that the pool page is allocated to the virtual LU page (S1611: YES), the processing advances to S1612. In the case that the pool page is not yet allocated to the virtual LU page (S1611: NO), the processing advances to S1613.

In S1612, the storage apparatus 10 acquires the pool page (the content of the pool page start address 1224) to be accessed for the I/O request 50 by checking the contents of the virtual LUN 53 and the page address 54 in the I/O request 50 against the virtual LU page management table 122, and identifies the physical page forming the pool page by checking the acquired pool page against the content of the pool page start address 1232 in the pool/physical page management table 123. Then, the processing advances to S1614.

In S1613, the storage apparatus 10 allocates a pool page to the write destination virtual LU page (the virtual LU page specified by the virtual LUN 53 and the page address 54 in the I/O request 50). To be more specific, the storage apparatus 10 obtains a pool page not in use from the pool/physical page management table 123 and allocates the obtained pool page to the write destination virtual LU page (updates the contents of the virtual LU page management table 122). Then, the processing advances to S1614.

In S1614, the storage apparatus 10 performs processing for setting up a cache area (an area in the memory 14)(identifying or allocating a cache area) to be used in the I/O processing responding to the I/O request 50 (hereinafter, called cache control processing S1614). The details of the cache control processing S1614 will be described later.

After the execution of the cache control processing S1614, the storage apparatus 10 stores the write data (contents of the data 57 of the I/O request 50) in the cache area of the memory 14 reserved in the cache control processing S1614 (S1615).

Figure 17:
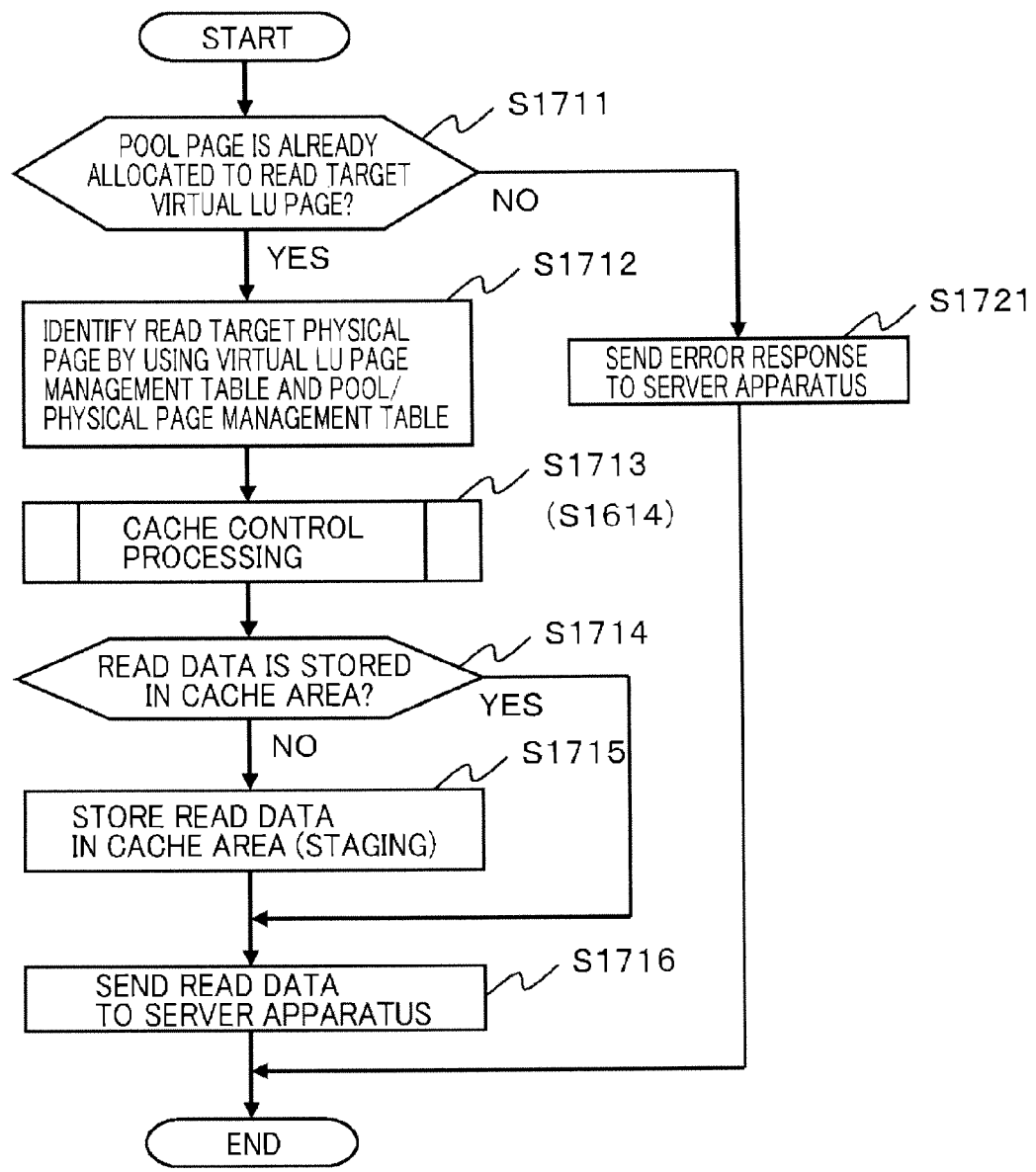
FIG. 17 is a flowchart explaining data read processing S1530.

FIG. 17 is a flowchart explaining the details of the data read processing S1530 shown in FIG. 15. The data read processing S1530 is described below with reference to FIG. 17.

Firstly, the storage apparatus 10 judges whether or not a pool page (pool page start address) is already allocated to the virtual LU page specified by the virtual LUN 53 and the page address 54 in the I/O request 50, by checking the contents in the virtual LUN 53 and the page address 54 in the I/O request 50 against the virtual LU page management table 122 (S1711). In the case that the pool page is allocated to the virtual LU page (S1711: YES), the processing advances to S1712. In the case that the pool page is not yet allocated to the virtual LU page (S1711: NO), the processing advances to S1721.

In S1721, the storage apparatus 10 returns an error response (a read error, particular data (e.g., data such as "0" or NULL)) to the server apparatus 3 that is the sender of the I/O request 50, and terminates the processing.

In S1712, the storage apparatus 10 acquires the pool page (the contents of the pool page start address 1224) to be accessed for the I/O request 50 by checking the contents in the virtual LUN 53 and the page address 54 in the I/O request 50 against the virtual LU page management table 122, and identifies the physical page forming the pool page by checking the acquired pool page against the contents of the pool page start address 1232 in the pool/physical page management table 123. When the physical page is identified, then, the storage apparatus 10 executes the foregoing cache control processing S1614 (S1713).

Thereafter, the storage apparatus 10 judges whether or not the read data to be read for the I/O request 50 already exists in the cache area of the memory 14 (whether or not the read data is staged) (S1714). In the case that the read data does not exist in the cache area (S1714: NO), the storage apparatus 10 stages the read target data to the cache area of the memory 14 (S1715). Then, the processing advances to S1716. In contrast, in the case that the read data exists in the cache area (S1714: YES), the processing advances to S1716.

In S1716, the storage apparatus 10 transmits the read data to the server apparatus 3.

Figure 18:
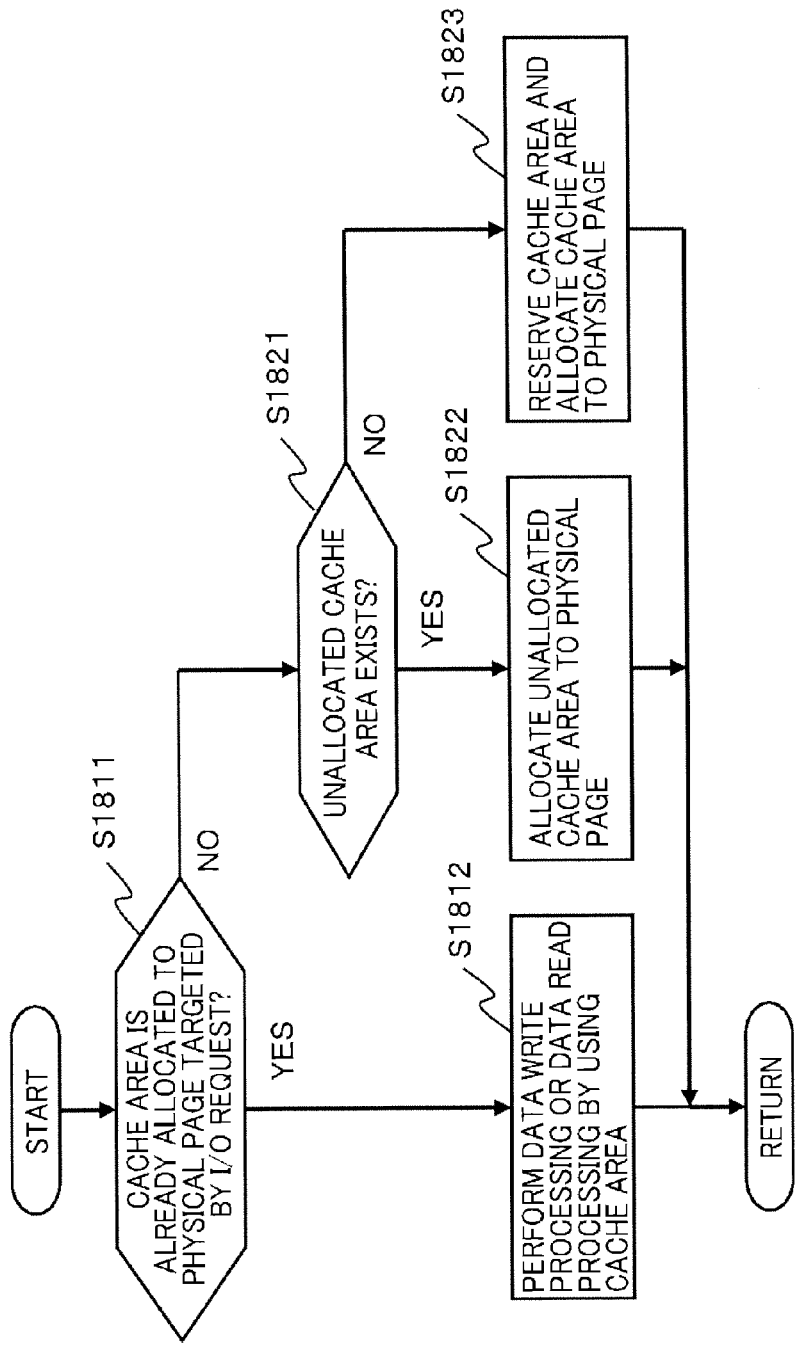
FIG. 18 is a flowchart explaining cache control processing S1614 and S1713.

FIG. 18 is a flowchart explaining the details of the foregoing cache control processing S1614 (S1713). The cache control processing S1614 (S1713) is described below with reference to FIG. 18.

The storage apparatus 10 first judges whether or not a cache area is allocated to the physical page targeted by the I/O request 50 (S1811). Further, the storage apparatus 10 obtains the pool page (pool page start address) corresponding to the virtual LU page address in the I/O request 50 by checking the virtual LU page address set in the virtual LU page address 54 in the I/O request 50 against the virtual LU page management table 122, and then obtains the physical page (physical page start address) targeted by the I/O request 50 by checking the obtained pool page (pool page start address) against the pool/physical page management table 123.

In the case that the cache area is allocated to the physical page targeted by the I/O request 50 (S1811: YES), the storage apparatus 10 advances to S1812 and performs the data write processing or data read processing using the cache area (S1812). In the case that no cache area is allocated to the physical page targeted by the I/O request 50 (S1811: NO), the processing advances to S1821.

In S1821, the storage apparatus 10 judges whether or not there is an unallocated cache area. This judgment is made in reference to a cache area management table 1900, shown in FIG. 19, which is stored in the memory 14 of the storage apparatus 10.

FIG. 19 shows an example of the cache area management table 1900. As shown in FIG. 19, the cache area management table 1900 includes one or more records having items of a RAID group ID 1911, a physical page address 1912, and a cache unit area start address 1913. Among them, the RAID group ID 1911 is set with a RAID group ID. The physical page start address 1912 is set with a physical page start address. The cache unit area start address 1913 is set with the start address of a cache unit area that is a unit of cache area to be allocated.

In FIG. 19, in the case that "N/A" is set in the RAID group ID 1911 and the physical page start address 1912, this indicates that the cache unit area is unallocated.

Here, returning to FIG. 18, in the case that there is an unallocated cache area (cache unit area)(S1821:YES), the storage apparatus 10 allocates the unallocated cache area to the physical page (S1822). Then, the storage apparatus 10 performs the data write processing or the data read processing using the allocated cache area.

In contrast, in the case that there is no unallocated cache area S1821: NO), the storage apparatus 10 reserves a cache area in a free area or the like in the memory 14 and allocates the cache area to the physical page (S1823). Then, the storage apparatus 10 performs the data write processing or the data read processing using the allocated cache area.

<Migration>

As described above, the storage apparatus 10 determines a tier (the tier appropriate for each I/O count) of each pool page forming the virtual LU 71 on the basis of the I/O count of the pool page (the value of the I/O count 1236 in the pool/physical page management table 123). In the case that the determined tier does not coincide with the current tier of the pool page, the storage apparatus 10 makes the tier of the pool page coincide with the determined tier by changing allocation of the physical page to the pool page.

Figure 20:
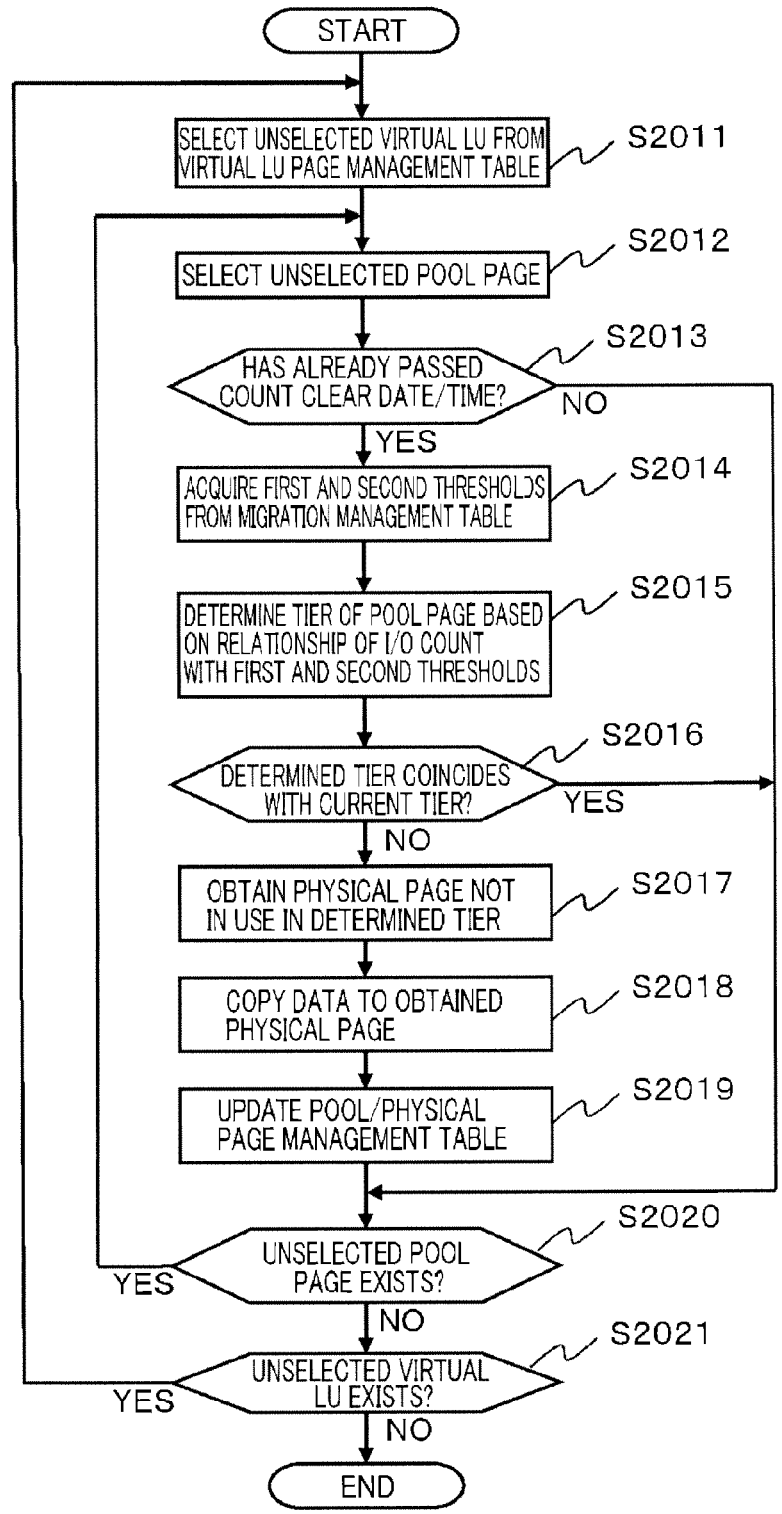
FIG. 20 is a flowchart explaining migration processing S2000.

FIG. 20 is a flowchart explaining (hereinafter, called migration processing S2000) performed in the above operation. The migration processing S2000 is started at any given timing or at a timing scheduled in advance.

To begin with, the storage apparatus 10 selects a virtual LU 71 from the virtual LU page management table 122 (S2011). Then, the storage apparatus 10 selects the pool page of the virtual LU 71 selected in S2011 from the pool/physical page management table 123 (S2012).

Next, the storage apparatus 10 obtains the count clear date/time 1237 of the pool page selected in S2012 from the pool/physical page management table 123, and judges whether or not the current date/time has passed the count clear date/time (S2013). In the case that the current date/time has passed the count clear date/time (S2013: YES), the processing advances to S2014. In the case that the current date/time has not yet passed the count clear date/time (S2013: NO), the processing advances to S2020.

In S2014, the storage apparatus 10 obtains the values of the first threshold 1242 and the second threshold 1243 set for the storage apparatus 10 itself from the migration management table 124.

After that, the storage apparatus 10 obtains the value of the I/O count 1236 of the currently selected pool page from the pool/physical page management table 123, and figures out the tier (a tier to which the pool page should belong) of the selected pool page by comparing the obtained I/O count against the first threshold and the second threshold (S2015). The storage apparatus 10 determines the tier of the pool page as "Tier1" in the case that the I/O count is larger than the first threshold, as "Tier2" in the case that the I/O count is equal to or smaller than the first threshold and is larger than the second threshold, and as "Tier3" in the case that the I/O count is equal to or smaller than the second threshold.

Subsequently, the storage apparatus 10 obtains the current tier (the value of the TierID 1235) of the selected pool page from the pool/physical page management table 123, and judges whether or not the tier figured out in S2015 and the current tier coincide with each other (S2016). In the case that these tiers coincide (S2016:YES), the processing advances to S2020. In the case that these tiers do not coincide (S2016: NO), the processing advances to S2017.

In S2017, the storage apparatus 10 obtains a physical page that is unallocated ("N/A" is set in the pool ID 1231 and the pool page start address 1232) and belongs to the figured-out tier in reference to the pool/physical page management table 123. Then, the storage apparatus 10 copies data in the physical page forming the selected pool page to the unallocated physical page thus obtained (S2018). After completion of the data copy, the storage apparatus 10 allocates the unallocated physical page having data copied thereto to the selected pool page. In addition, the storage apparatus 10 updates the contents in the pool/physical page management table 123 to the contents after the allocation (S2019).

In S2020, the storage apparatus 10 judges whether or not there is a pool page yet to be selected in S2012. In the case that there is a pool page yet to be selected (S2020: YES), the processing returns to S2012. In the case that there is no pool page yet to be selected (S2020: NO), the processing advances to S2021.

In S2021, the storage apparatus 10 judges whether or not there is a virtual LU 71 yet to be selected in S2011. In the case that there is a virtual LU 71 yet to be selected (S2021: YES), the processing returns to S2011. In the case that there is no virtual LU 71 yet to be selected (S2021: NO), the processing is terminated.

As described above, in the information processing system 1 according to this embodiment, when a sender of an I/O request sent from the server apparatus 3 to the storage apparatus 10 is a particular application designated in advance, the storage apparatus 10 counts the I/O count of each pool page in accordance with the I/O count policy set for the application. Then, the storage apparatus 10 determines the tier (appropriate tier) of each pool page according to the counted I/O count of the pool page, and allocates the physical page in the determined tier to each pool page so that the tier of each pool page can coincide with the determined tier (appropriate tier).

In this way, to each designated application, pool pages in a tier appropriate for the application can be allocated. Thus, for example, pool pages in a high tier can be allocated to a particular application required to exert high I/O processing performance. In addition, the I/O count is counted only for the designated application, and the tier change (migration) is performed for the pool pages used by the designated application. Thus, the load on the storage apparatus 10 is not unnecessarily increased, and optimization of pool page allocation (allocation of pool pages in an appropriate tier) to applications can be performed with a low load. Moreover, since the optimization is performed for the applications designated by the users, the optimization can meet the users' needs.

Note that, in the information processing system 1 according to this embodiment, since the I/O counts are counted only for the applications designated in advance and are counted in accordance with the I/O count policies set for the applications, the total number of I/O counts of all the pool pages is not necessarily equal to the number of I/O requests 50 actually sent from the server apparatus 3.

Second Embodiment

In the information processing system 1 according to the first embodiment, "COUNT" or "DON'T COUNT" is settable as the I/O count policy for each page, and the counting of the I/O count of each pool page is controlled in accordance with the I/O count policy. In contrast to this, in an information processing system 1 according to a second embodiment, a numerical value (weight) is set as the I/O count policy, and the counting of the I/O count of each pool page is controlled in accordance with the set numerical value.

Hereinafter, description will be provided for the information processing system 1 according to the second embodiment. Note that, the hardware configuration of the information processing system 1 in the second embodiment is basically the same as that in the first embodiment. In addition, the software configuration and data structure of the information processing system 1 in the second embodiment are also basically the same as those in the first embodiment. Unlike the information processing system 1 in the first embodiment, however, the control program 111 in the second embodiment has an algorithm for executing processing which will be described later, instead of having an algorithm for executing the processings S1422 to S1426 in FIG. 14.

FIG. 21 shows an example of a server I/O count management table 311 stored in a server apparatus 3 and a management terminal 4 in the information processing system 1 of the second embodiment. FIG. 22 shows an example of a storage I/O count management table 121 stored in a storage apparatus 10 and the management terminal 4 in the information processing system 1 of the second embodiment.

As shown in FIGS. 21 and 22, in the information processing system 1 according to the second embodiment, numerical values (such as "3", "1", "2" and "0") are set as the I/O count policies (an I/O count policy 3113 and an I/O count policy 1212).

These numerical values indicate weights when counting the I/O count (the value of the I/O count 1236) of each pool page in response to each I/O request issued from an application. For example, in the case that "1" is set as the I/O count policy, "1" is added to the value of the I/O count 1236 (count-up). In the case that "2" is set as the I/O count policy, "2" is added to the value of the I/O count 1236. In the case that "3" is set as the I/O count policy, "3" is added to the value of the I/O count 1236.

Note that, "0" in the I/O count policy indicates keeping the I/O count 1236 unchanged (this is equivalent to the case where "DON'T COUNT" is set as the I/O count policy 3113 in the first embodiment).

Figure 23:
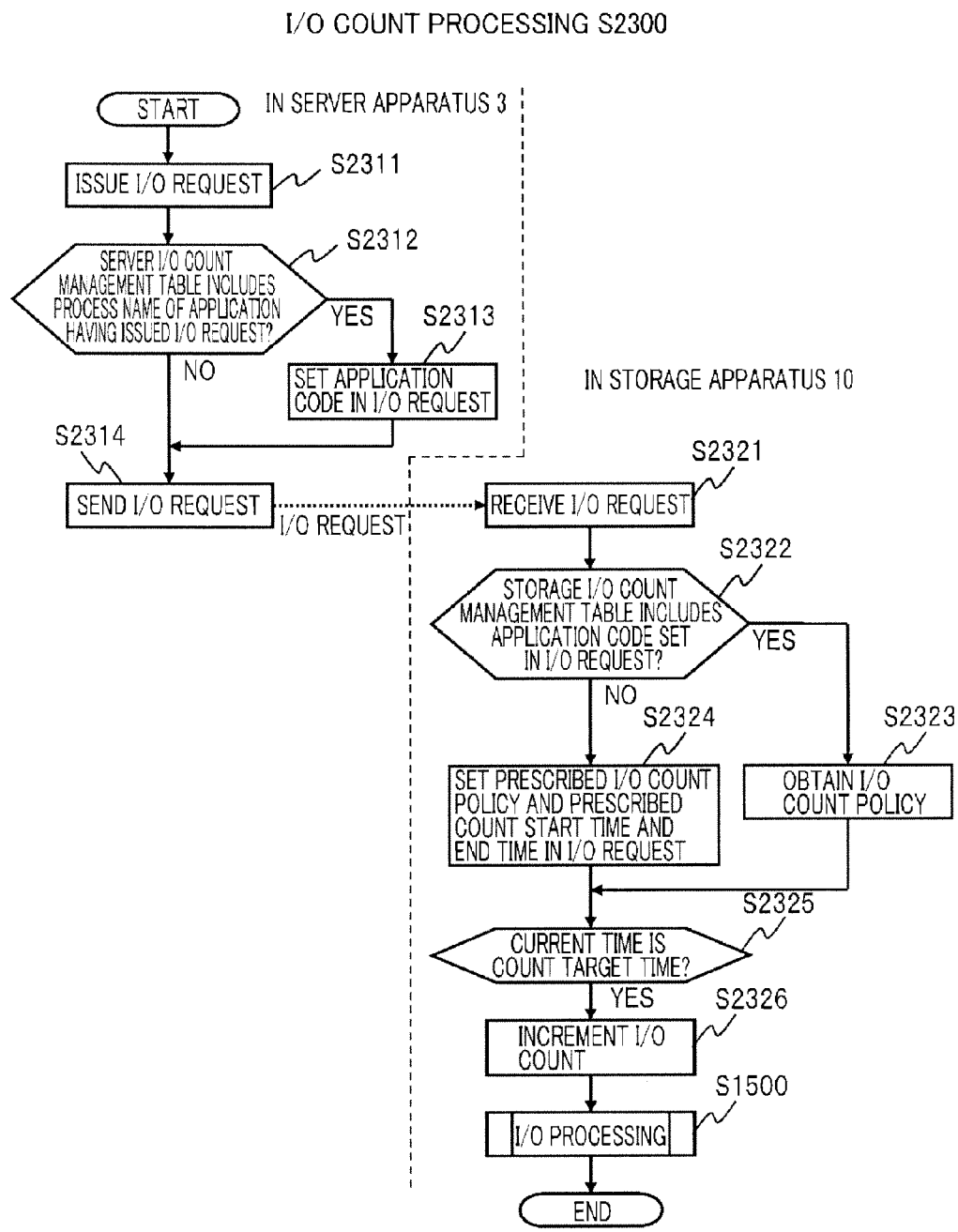
FIG. 23 is a flowchart explaining I/O count processing S2300.

FIG. 23 is a flowchart explaining processing (hereinafter, called I/O count processing S2300) performed by the server apparatus 3 and the storage apparatus 10 in the second embodiment. Note that, the I/O count processing S2300 corresponds to the I/O count processing S1400 in the information processing system 1 of the first embodiment. The I/O count processing S2300 is described below with reference to FIG. 23.

The processing (S2311 to S2314) in the server apparatus 3 in FIG. 23 is the same as the processing S1411 to S1414 shown in FIG. 14.

Upon receipt of an I/O request 50 from the server apparatus 3 (S2321), the storage apparatus 10 judges whether or not the storage I/O count management table 121 includes a record corresponding to the application code set in the I/O request 50 (S2322). In the case that the record exists (S2322: YES), the storage apparatus 10 obtains the I/O count policy set in the I/O count policy 1212 of the record (S2323), and then advances to S2325. In the case that the record does not exist (S2322: NO), the storage apparatus 10 sets, for the I/O request 50, a prescribed I/O count policy (such as "1", "0", for example), a prescribed count start time and a prescribed count end time (for example, such as "always") (time information)(S2324), and then advances to S2325.

In S2325, the storage apparatus 10 judges whether or not the current time is a count target time of the I/O count, i.e., whether or not the current time falls within a period defined by the count start time and the count end time. In the case that the current time is the count target time (S2325: YES), the storage apparatus 10 adds a value corresponding to the I/O count policy obtained in S2323 or the prescribed I/O count policy set in S2324, to the I/O count 1236 of the pool page to be accessed for the I/O count 50 in the pool/physical page management table 123 (S2326). Then, the storage apparatus 10 performs the same processing as the foregoing processing S1500.

As described above, in the information processing system 1 of the second embodiment, a numerical value (weight) is set as the I/O count policy, and the counting of the I/O count of each pool page is controlled according to the set numerical value (weight). Thus, a method of counting the I/O count is settable in a detailed manner according to a performance requirement on each application, operational constraints of the storage apparatus 10, and the like. Hence, the detailed control can be performed over allocations of pool pages to individual applications, in accordance with such as the performance requirement to the applications, and can therefore allocate physical pages to pool pages appropriately according to needs of the users.

Third Embodiment

In the information processing systems 1 of the first and second embodiments, the user operates the management terminal 4 to set the I/O count policy for each application and the storage apparatus 10 counts the I/O count of each pool page in accordance with the I/O count policy thus set. In a third embodiment, instead of using the I/O count policy set by the user as in the first and second embodiments, a storage apparatus 10 automatically determines an attribute of an I/O request 50 sent from a server apparatus 3, and counts the I/O count of each pool page according to the attribute thus determined.

Figure 24:
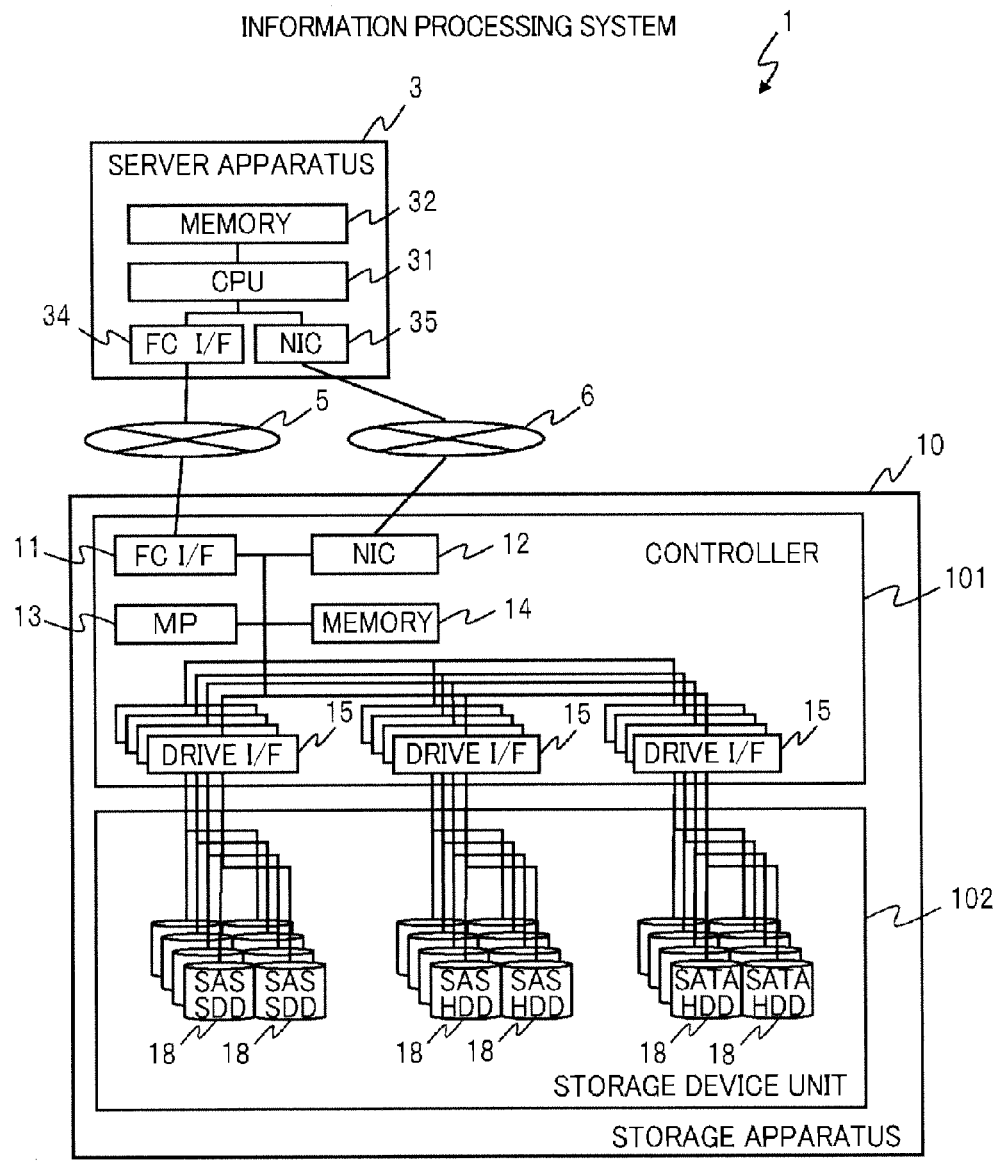
FIG. 24 is a diagram showing a hardware configuration of an information processing system 1 illustrated as a third embodiment.

FIG. 24 shows a hardware configuration of an information processing system 1 illustrated as a third embodiment. As shown in FIG. 24, the hardware configuration in the third embodiment is basically the same as the hardware configurations of the information processing systems 1 of the first and second embodiments except that the management terminal 4 is not always necessary.

FIG. 25 shows main programs and main data stored in a memory 32 of the server apparatus 3 in the information processing system 1 illustrated as the third embodiment. The programs and data in the third embodiment are basically the same as those in the first and second embodiments, except that the server I/O count management table 311 is not included, and that a driver program 302 does not include an algorithm for setting an application code in an I/O request 50.

FIG. 26 shows main programs and main data stored in a memory 14 of the storage apparatus 10 in the information processing system 1 illustrated as the third embodiment. The programs and data in the third embodiment are basically the same as those in the first and second embodiments, except that the storage I/O count management table 121 is not included and that a control program 111 does not include an algorithm for executing the processing S1422 to S1426 in FIG. 14 and the processing S2322 to S2326 in FIG. 23, but includes an algorithm for executing processing which will be described later.

As described above, in the third embodiment, the counting of the I/O count is controlled according to the attribute of an I/O request 50. The following description will be provided for an exemplary configuration in which a predetermined value is added to the I/O count in the case that a random access to a pool page occurs.

Figure 27:
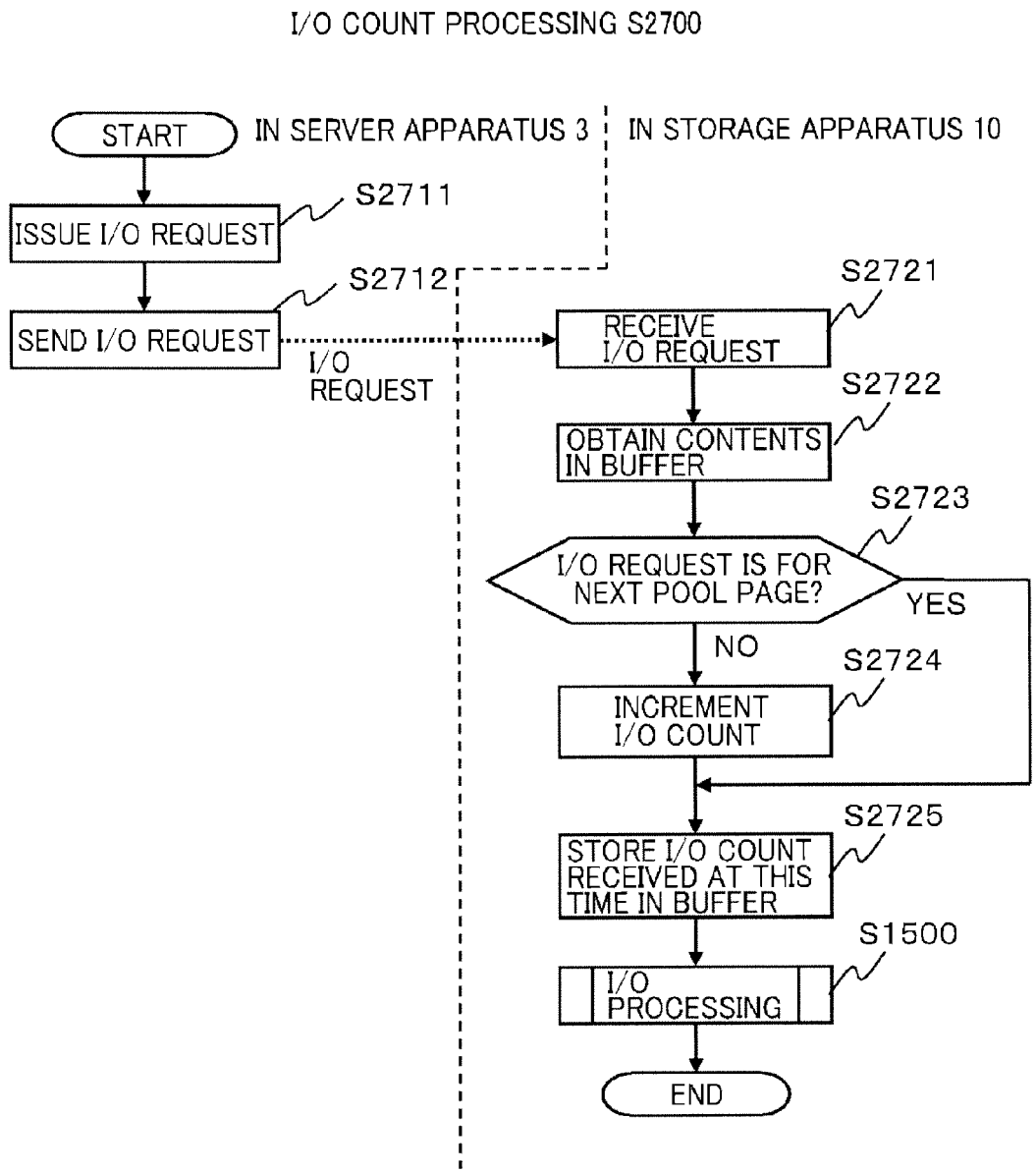
FIG. 27 is a flowchart explaining I/O count processing S2700.

FIG. 27 is a flowchart explaining processing (hereinafter, called I/O count processing S2700) performed in the information processing system 1 of the third embodiment. The I/O count processing S2700 is described below with reference to FIG. 27.

The server apparatus 3 generates an I/O request (S2711), and then sends the generated I/O request 50 to the storage apparatus 10 (S2712).

Upon receipt of the I/O request 50 from the server apparatus 3 (S2721), the storage apparatus 10 obtains the I/O request 50 stored in a buffer (for example, a predetermined storage area reserved in the memory 14)(the I/O request 50 stored in the buffer in S2725 to be described later, when receiving the previous I/O request 50) (S2722). Then, the storage apparatus 10 judges whether or not the pool page targeted by the I/O request 50 received at this time (hereinafter, this pool page is called a current page) is a pool page immediately following the pool page targeted by the I/O request 50 received at the previous time (hereinafter, this pool page is called a previous page)(the storage apparatus 10 judges whether or not the pool page start address of the current page is an address obtained by adding a unit size of the pool page to the pool page start address of the previous page)(S2723).

In the case that the current page is the immediately following pool page (in the case of sequential access)(S2723: YES), the processing advances to S2725. In contrast, in the case that the current page is not the immediately following pool page (in the case of random access) (S2723: NO), the storage apparatus 10 adds a predetermined value (for example, "1") to the I/O count in the pool/physical page management table 123 (S2724), and then advances to S2725.

In S2725, the storage apparatus 10 stores the I/O request 50 received at this time in the buffer, and then performs the same processing as in the foregoing processing S1500.

In the information processing system 1 of the third embodiment, the storage apparatus 10 automatically controls the counting of the I/O count according to the attribute of each I/O request 50, as described above. Therefore, a pool page in an appropriate tier can be allocated to each application. For example, for an application not required to exert very high performance (for example, an application that mainly generates sequential accesses like an application for batch service, data backup or the like), the pool pages accessed by the application can be automatically migrated to a low tier. Further, for example, for an application required to exert high performance (for example, an application that mainly generates random accesses like an application for on-line service), the pool pages accessed by the application can be automatically migrated to a high tier.

Although the embodiments have been described hereinabove, the aforementioned embodiments are provided merely for facilitating the understanding of the present invention, and should not be interpreted as limiting the present invention. The present invention can be modified and altered without departing from the spirit and scope of the present invention, and includes any of its equivalents.

The invention claimed is:

1. A storage apparatus communicatively coupled to a server apparatus on which a plurality of applications run, the storage apparatus:
   providing the server apparatus with a virtual volume in thin provisioning;
   performing I/O processing on the virtual volume according to an I/O request sent from the server apparatus;
   allocating, from a storage pool that is able to provide a plurality of types of physical pages classified into tiers, a physical page to each of pool pages, the pool page being an allocation unit of a storage area to the virtual volume;
   storing an I/O count of each of the pool pages, the I/O count indicating a number of the I/O requests issued to each of the pool pages;
   storing an I/O count policy that is a policy specifying a method of counting the I/O count, the I/O count policy being set for each of the applications;
   receiving information specifying the application that issued the I/O request, when receiving the I/O request;
   counting the I/O count of each of the pool pages in accordance with the I/O count policy set for the application specified from the received information;
   determining a tier of the physical page to be allocated to each of the pool pages, according to the I/O count of each of the pool pages; and
   allocating the physical page in the tier determined for each of the pool pages, to each of the pool pages.

2. The storage apparatus according to claim 1, wherein the I/O count policy instructs whether or not to count the I/O count.

3. The storage apparatus according to claim 1, wherein the I/O count policy includes information specifying a weight that is added to the I/O count in the counting of the I/O count.

4. The storage apparatus according to claim 1, wherein the storage apparatus stores time information that is information specifying a time to count the I/O count, the time information being set for each of the applications,
   the storage apparatus counts the I/O count of each of the pool pages, only in the case that a current time matches with a time specified by the time information.

5. The storage apparatus according to claim 1, wherein in the case that the tier of a first physical page currently allocated to the pool page is different from a tier determined for the pool page, the storage apparatus copies data stored in the first physical page currently allocated to the pool page to a second physical page in the determined tier, and reallocates the second physical page to the pool page.

6. The storage apparatus according to claim 1, wherein the storage apparatus stores a tier determination date/time for each of the pool pages, the tier determination date/time being a date/time to determine a tier of the physical page, which is to be allocated to each of the pool pages, according to the I/O count of the pool page, and
   for the pool page in which the current date/time has already passed the tier determination date/time, the storage apparatus determines the tier of the physical page to be allocated to the pool page, according the I/O count of the pool page, and allocates the physical page in the determined tier to the pool page.

7. The storage apparatus according to claim 1, wherein
the storage apparatus stores at least one or more thresholds to be compared with the I/O count, and
the storage apparatus determines the tier of the physical page that is to be allocated to each of the pool pages, according to a result of comparison of the I/O count of the pool page with the threshold.

8. The storage apparatus according to claim 1, wherein
the physical pages are formed by using storage areas of storage drives, and
each of the physical pages is classified into the tiers according to a type of the storage drive used to form the physical page.

9. The storage apparatus according to claim 8, wherein
the storage drives include at least an SSD (Solid State Drive) drive, an SAS (Serial Attached SCSI) drive, and a SATA (Serial ATA) drive.

10. The storage apparatus according to claim 1, wherein
the storage apparatus is communicatively coupled to a management terminal including a user interface that provides a setting environment of the I/O count policy for each of the applications.

11. The storage apparatus according to claim 1, wherein
the I/O count policy specifies whether or not to count the I/O count,
the I/O count policy includes information specifying a weight that is added to the I/O count in the counting of the I/O count,
the storage apparatus stores time information that is information set for each of the applications and specifying a time to count the I/O count,
the storage apparatus counts the I/O count of each of the pool pages, only when a current time matches with a time specified by the time information,
in the case that the tier of a first physical page currently allocated to each of the pool pages is different from a tier determined for the pool page, the storage apparatus copies data stored in the first physical page currently allocated to the pool page to a second physical page in the determined tier, and reallocates the second physical page to the pool page,
the storage apparatus stores a tier determination date/time for each of the pool pages, the tier determination date/time being a date/time to determine the tier of the physical page that is to be allocated to each of the pool pages, according to the I/O count of the pool page,
for the pool page in which the current date/time has passed the tier determination date/time, the storage apparatus determines the tier of the physical page to be allocated to the pool page, according the I/O count of the pool page, and allocates the physical page in the determined tier to the pool page,
the storage apparatus stores at least one or more thresholds to be compared with the I/O count,
the storage apparatus determines the tier of the physical page that is to be allocated to each of the pool pages, according to a result of comparison of the I/O count of the pool page with the threshold,
the physical pages are formed by using storage areas of storage drives,
each of the physical pages is classified into the tiers according to a type of the storage drive used to form each of the physical pages,
the storage drives include at least an SSD (Solid State Drive) drive, a SAS (Serial Attached SCSI) drive, and a SATA (Serial ATA) drive, and
the storage apparatus is communicatively coupled to a management terminal including a user interface that provides a setting environment of the I/O count policy for each of the applications.

12. A method of controlling a storage apparatus communicatively coupled to a server apparatus on which a plurality of applications run, the method comprising steps of:
providing the server apparatus with a virtual volume in thin provisioning;
performing I/O processing on the virtual volume according to an I/O request sent from the server apparatus;
allocating, from a storage pool that is able to provide a plurality of types of physical pages classified into tiers, a physical page to each of pool pages, the pool page being an allocation unit of a storage area to the virtual volume;
storing an I/O count of each of the pool pages, the I/O count indicating a number of the I/O requests issued to each of the pool pages;
storing an I/O count policy that is a policy specifying a method of counting the I/O count, the I/O count policy being set for each of the applications;
receiving information specifying the application that issued the I/O request, when receiving the I/O request;
counting the I/O count of each of the pool pages in accordance with the I/O policy set for the application specified from the received information; and
determining a tier of the physical page to be allocated to each of the pool pages, according to the I/O count of each of the pool pages, and allocating the physical page in the tier determined for each of the pool pages, to each of the pool pages.

13. The method of controlling a storage apparatus according to claim 12, wherein
the I/O count policy specifies whether or not to count the I/O count.

14. The method of controlling a storage apparatus according to claim 12, wherein
the I/O count policy includes information specifying a weight that is added to the I/O count in the counting of the I/O count.

15. The method of controlling a storage apparatus according to claim 12, further comprising steps of:
storing time information that is information specifying a time to count the I/O count, the time information being set for each of the applications; and
counting the I/O count of each of the pool pages, only in the case that a current time matches with a time specified by the time information.

16. The method of controlling a storage apparatus according to claim 12, further comprising step of:
in the case that the tier of a first physical page currently allocated to each of the pool pages is different from the tier determined for the pool page, copying data stored in the first physical page currently allocated to the pool page to a second physical page in the determined tier, and reallocating the second physical page to the pool page.

* * * * *